(12) United States Patent
Kim et al.

(10) Patent No.: US 11,018,540 B2
(45) Date of Patent: May 25, 2021

(54) SLIM-TYPE STATOR, AND SINGLE PHASE MOTOR AND COOLING FAN USING SAME

(71) Applicant: AMOTECH CO., LTD., Incheon (KR)

(72) Inventors: Byung Soo Kim, Anyang-si (KR); Jin Gwan Kim, Chuncheon-si (KR)

(73) Assignee: AMOTECH CO., LTD., Incheon (KR)

( * ) Notice: Subject to any disclaimer, the term of this patent is extended or adjusted under 35 U.S.C. 154(b) by 161 days.

(21) Appl. No.: 16/093,330

(22) PCT Filed: Apr. 6, 2017

(86) PCT No.: PCT/KR2017/003770
§ 371 (c)(1),
(2) Date: Oct. 12, 2018

(87) PCT Pub. No.: WO2017/183837
PCT Pub. Date: Oct. 26, 2017

(65) Prior Publication Data
US 2019/0149002 A1    May 16, 2019

(30) Foreign Application Priority Data

Apr. 19, 2016 (KR) .................. 10-2016-0047686

(51) Int. Cl.
*H02K 3/26* (2006.01)
*H02K 7/14* (2006.01)
(Continued)

(52) U.S. Cl.
CPC .......... *H02K 3/26* (2013.01); *F04D 25/0653* (2013.01); *F04D 25/0666* (2013.01);
(Continued)

(58) Field of Classification Search
CPC ............ H02K 1/12; H02K 3/26; H02K 5/163; H02K 7/085; H02K 7/14; H02K 11/30;
(Continued)

(56) References Cited

U.S. PATENT DOCUMENTS 4,620,139 A * 10/1986 Egami .................... H02K 29/08
310/62
4,658,162 A * 4/1987 Koyama ................. H01F 5/003
310/184
(Continued)

FOREIGN PATENT DOCUMENTS

JP        08154352     6/1996
JP        10248224     9/1998
(Continued)

OTHER PUBLICATIONS

English machine translation, Fukushima (JP 2002119022). (Year: 2002).*
(Continued)

*Primary Examiner* — Burton S Mullins
(74) *Attorney, Agent, or Firm* — Cantor Colburn LLP

(57) ABSTRACT

Provided are a slim-type stator using a multilayer printed circuit board (PCB) capable of maximally generating torque in an opposite rotor and capable of increasing airflow, and a single-phase motor and a cooling fan using the same. The slim-type stator includes: a multilayer PCB; and a plurality of coil patterns formed on respective PCB layers of the multilayer PCB and connected via throughholes, wherein the multilayer PCB includes at least one protrusion corresponding to the plurality of coil patterns, and at least one recess disposed between the plurality of coil patterns.

8 Claims, 16 Drawing Sheets

(51) Int. Cl.
  *H02K 11/215* (2016.01)
  *H02K 11/30* (2016.01)
  *H02K 3/28* (2006.01)
  *F04D 25/06* (2006.01)
  *H02K 1/12* (2006.01)
  *F04D 29/58* (2006.01)
  *H02K 11/33* (2016.01)
  *F04D 25/08* (2006.01)
  *H02K 5/16* (2006.01)
  *H02K 7/08* (2006.01)
  *H02K 21/24* (2006.01)

(52) U.S. Cl.
  CPC ........ *F04D 25/082* (2013.01); *F04D 29/5806* (2013.01); *H02K 1/12* (2013.01); *H02K 3/28* (2013.01); *H02K 5/163* (2013.01); *H02K 7/085* (2013.01); *H02K 7/14* (2013.01); *H02K 11/215* (2016.01); *H02K 11/30* (2016.01); *H02K 11/33* (2016.01); *H02K 21/24* (2013.01); *H02K 2203/03* (2013.01); *H02K 2211/03* (2013.01); *H02K 2213/03* (2013.01)

(58) Field of Classification Search
  CPC ............. H02K 11/33; H02K 2203/03; H02K 2211/03; F04D 25/0653; F04D 25/0666; F04D 25/0633; H05K 1/0284; H05K 1/0296; H05K 1/0298; H05K 1/11; H05K 1/115; H05K 1/119
  USPC .................................................... 310/DIG. 6
  See application file for complete search history.

(56) References Cited

U.S. PATENT DOCUMENTS

| | | | | | |
|---|---|---|---|---|---|
| 4,728,833 | A | * | 3/1988 | Shiraki | H02K 29/08 310/181 |
| 4,733,119 | A | * | 3/1988 | Shiraki | H02K 29/08 310/193 |
| 4,804,574 | A | * | 2/1989 | Osawa | H02K 3/26 428/209 |
| 4,861,237 | A | * | 8/1989 | Shiraki | F04D 25/0653 417/353 |
| 5,644,183 | A | * | 7/1997 | Van Loenen | H02K 21/24 310/268 |
| 6,172,442 | B1 | * | 1/2001 | Jun | H02K 29/03 310/268 |
| 7,541,709 | B2 | * | 6/2009 | Tsai | H02K 5/1735 310/90 |
| 7,619,337 | B2 | * | 11/2009 | Kasai | H02K 3/47 310/156.32 |
| 8,154,161 | B2 | * | 4/2012 | Horng | H02K 21/24 310/68 B |
| 8,193,678 | B2 | * | 6/2012 | Horng | H02K 3/26 310/208 |
| 8,360,747 | B2 | * | 1/2013 | Horng | H02K 5/225 417/354 |
| 8,536,970 | B2 | * | 9/2013 | Liang | H02K 3/26 336/200 |
| 2007/0222331 | A1 | * | 9/2007 | Horng | H02K 7/09 310/268 |
| 2011/0148226 | A1 | | 6/2011 | Horng et al. | |

FOREIGN PATENT DOCUMENTS

| | | | | |
|---|---|---|---|---|
| JP | 11146588 | | 5/1999 | |
| JP | 2002119022 | A * | 4/2002 | ............. H02K 11/00 |
| JP | 2011125168 | | 6/2011 | |
| JP | 2012050219 | | 3/2012 | |
| KR | 19870013976 | | 6/1990 | |
| KR | 20000044146 | | 7/2000 | |
| KR | 200296035 | | 11/2002 | |

OTHER PUBLICATIONS

International Search Report—PCT/KR2017/003770 dated Jul. 10, 2017.

* cited by examiner

FIRST PCB LAYER

SECOND PCB LAYER

THIRD PCB LAYER

FIFTH PCB LAYER

SLIM-TYPE STATOR, AND SINGLE PHASE MOTOR AND COOLING FAN USING SAME

TECHNICAL FIELD

The present disclosure relates to a stator of a motor, and more particularly, to a slim-type stator using a multilayer printed circuit board (PCB) capable of maximally generating torque in an opposite rotor and capable of increasing airflow, and a single-phase motor and a cooling fan using the same.

BACKGROUND ART

A small-sized fan motor is reduced in size and a single-phase motor having a single coil is used in consideration of cost burden. Such a single-phase motor is used, for example, in a small-sized motor for a cooling fan for cooling an exothermic component of an aspiration motor for an in-car sensor for detecting an indoor temperature to adjust the indoor temperature of a vehicle or various electronic apparatuses.

A single coil used in a single-phase motor is made of a core-type stator in which a coil is wound around the core, or wound in a quadrangular or triangular coreless/bobbinless type and mounted on a PCB.

Meanwhile, brushless direct-current (BLDC) motors are synchronous motors with fast dynamic response, low rotor inertia and easy speed control.

Considering the characteristics of the above-mentioned synchronous motor, when using a BLDC motor as a single-phase motor, a motor driving circuit or driver needs a Hall sensor for rotor position detection to generate a switching signal necessary for detecting N poles and S pole magnetic poles of the rotor to be rotated and periodically switching the application direction of the driving current flowing in the stator coil. Since the Hall sensor is expensive, it is preferable to use a driving circuit using only one Hall sensor.

In this case, in the case that a single Hall sensor is used, the magnetic pole of the Hall sensor is not detected when the Hall sensor is located at the interface of the rotor magnetic poles, and thus the current cannot be supplied to the stator coil at an initial state. Therefore, there is a dead point at which the starting cannot be performed.

As self-starting schemes avoiding a dead point in an initial state, in such a single Hall sensor system, there are a method of using an auxiliary magnet in a stator so as to deviate from a magnetic pole interface (that is, a neutral point) of a rotor by using a magnet for fixation, a method of providing a salient pole to one side of a tooth in a core type stator, a method of installing magnetic element screws in a coil laying portion as in Korean Utility Model Application Publication No. 20-1987-0013976 (Patent Document 1), and a method of using a dead point prevention yoke having a special shape as in Korean Utility Model Registration Publication No. 20-0296035 (Patent Document 2).

In the case of the method of providing a salient pole, when the magnet and the core are in the same circumference, the force (F) is uniformly generated on the entire surface of the magnet, and the direction of rotation is not predicted. The force is also equalized in the clockwise (CW) direction and the counterclock (CCW) direction so that the torque is reduced. In addition, when the salient pole is designed to be large, the cogging torque is increased, which is disadvantageous to the noise. Therefore, proper salient pole design is required.

In addition, in Patent Document 2, when the dead point prevention yoke is displaced, the initial starting of the rotor may fail. If the area of the yoke becomes larger than necessary, the force of collecting the magnetic force lines of the yoke becomes large, and thus there arises a problem that the much energy should be supplied for the initial starting.

In addition, when the dead point prevention yoke is provided separately from the stator, a self-starting failure may occur due to an error in alignment between the Hall sensor and the yoke.

An axial fan disclosed in Korean Patent Application Publication No. 20-1987-0013976 (Patent Document 3) constitutes a motor of an axial type in which a field magnet of a rotary fan and an armature coil are opposite in a face-to-face fashion. However, there is a problem that the height of the stator cannot be reduced further by adopting the structure in which an air core type armature coil is disposed in a coil laying portion.

In addition, a stator of a fan motor disclosed in Korean Patent Application Publication No. 10-2000-0044146 (Patent Document 4) includes a stator yoke and a single-phase armature coil stacked on an upper portion of a PCB, and a bearing holder at a center of the PCB in which a pair of ball bearings are built in to support a rotating shaft. However, there is still a problem that the stator cannot be made in the form of a thin film.

Furthermore, in the case of a small fan, the coil is composed of fine wires in a general coil winding method in which a stator coil is wound on a bobbin, a stator coil is wound in a bobbinless type, or a stator coil is wound on a core. Therefore, when the thickness of the coil is constant in the start line and the end line, there is a problem that the start line and the end line may be broken due to careless handling or vibration during soldering the start line and the end line on a solder land or terminal of the PCB, or a manual soldering process may be defective.

DISCLOSURE

Technical Problem

Accordingly, the present disclosure has been made to solve the above-mentioned problems, and it is an object of the present disclosure to provide a slim-type stator using a multilayer printed circuit board (PCB), which is capable of maximally generating a torque in an opposed rotor and widely secures a passageway of a wind inlet in a Sirocco-type fan, to increase an airflow, and a single-phase motor and a cooling fan using the same.

Another object of the present disclosure is to provide a slim-type stator for a single-phase motor using a multilayer board (PCB), in which, when coil patterns of respective layers form a star-shaped pattern or a fan-shaped spiral pattern, for example, since a plurality of rotating direction pattern portions and a plurality of radial direction pattern portions are alternately arranged, the radial direction pattern portions are oriented in the radial direction from the center thereof so that a rotating force applied to the opposite rotor can be maximally obtained, thereby improving the performance of the motor, and the single-phase motor and a cooling fan using the same.

It is still another object of the present disclosure to provide a slim-type stator capable of adjusting a torque value and a driving current value required for a single-phase motor by connecting, in series connection, parallel connection, or series/parallel connection, a plurality of coil patterns of a multilayer PCB patterned in a spiral pattern to form a plurality of turns, and a single-phase motor and a cooling fan using the same.

Another object of the present disclosure is to provide a slim-type stator capable of implementing a dead point prevention yoke function without using a separate dead point prevention yoke by forming bridges corresponding to the number of rotor magnetic poles while forming a wind inlet in a lower case, and a single-phase motor and a cooling fan using the same.

Another object of the present disclosure is to provide a slim-type stator capable of implementing a dead point prevention yoke function as well as maximizing maneuverability by forming a dead point prevention protrusion protruding in a wind inlet provided in a lower case so as to minimize a starting torque of a fan, so that only a part of an outer periphery or an inner side of a magnetic force line of a magnet is used, and a single-phase motor and a cooling fan using the same.

It is another object of the present disclosure to provide a slim-type cooling fan capable of expanding diameter of a sleeve bearing for supporting a rotating shaft of a rotor so as to contain sufficient oil, by utilizing a space in which a core type stator which has been conventionally employed in a radial type motor has been removed, by adopting an axial type structure using a thin film stator, thereby improving reliability and durability.

It is another object of the present disclosure to provide a slim-type cooling fan in which a start portion and an end portion of respective layer coil patterns in a slim-type stator are formed wider than portions forming coils (windings) to easily interconnect the coil patterns, easily connect with wiring patterns, and increase reliability of connections.

Technical Solution

According to an aspect of the present disclosure, there is provided a slim-type stator including: a multilayer printed circuit board (PCB); and a plurality of coil patterns formed on respective PCB layers of the multilayer PCB and connected via throughholes, wherein the multilayer PCB includes at least one protrusion corresponding to the plurality of coil patterns, and at least one recess disposed between the plurality of coil patterns.

The multilayer PCB may have protrusions corresponding to the plurality of coil patterns and recesses disposed between the protrusions. In addition, the number of protrusions and the number of recesses may correspond to 1, 2, or (the number of magnetic poles of the rotor)/2, respectively.

The slim-type stator according to an embodiment of the present disclosure further includes a Hall sensor disposed on the multilayer PCB for detecting a rotor rotation position, wherein the Hall sensor is positioned and set at a position shifted from a magnetic pole interface of a rotor positioned by a dead point prevention yoke when the rotor is in an initial state.

The Hall sensor may be disposed at a position deviated by a ¼ magnetic pole width from the interface of the magnetic poles or the center of the magnetic poles.

In addition, the dead point prevention yoke may use a plurality of bridges or a plurality of yoke protrusions formed corresponding to the number of magnetic poles of the rotor in a case where a stator is installed in a single-phase motor.

Further, the dead point prevention yoke is stacked on a lower portion of the stator, and has an outer periphery of a polygonal shape of (the number of magnetic poles)/N where N is a divisor of the number of magnetic poles, and an inner periphery of a circular shape.

Each of the coil patterns may have a fan shape, for example, and may be spirally patterned to form a plurality of turns.

The coil patterns may be provided corresponding to (the number of magnetic poles of the rotor)/2 in each PCB layer, and may be arranged along the radial direction for every angle of (360°/the number of magnetic poles of the rotor).

In addition, the fan-shaped coil patterns may include: inner and outer rotating direction pattern portions disposed concentrically at intervals on an inner circumference and an outer circumference in the circumferential direction; and a pair of radial direction pattern portions both ends of which are arranged along the radial direction, and interconnect the inner rotating direction pattern portion and the outer rotating direction pattern portion.

In this case, the outer rotating direction pattern portion may be longer than the inner rotating direction pattern portion so that the radial direction pattern portion interconnects the inner rotating direction pattern portion and the outer rotating direction pattern portion with each other along the radial direction from the center thereof.

A coil pattern disposed on any one PCB layer of the multilayer PCB may further include a plurality of jump line patterns which are patterned in a helical shape to form a plurality of turns having a plurality of protrusions and a plurality of recesses, and for interconnecting the fan-shaped coil patterns arranged on the other PCB layer via the throughholes located at both ends and spaced apart from each other along the inside of the protrusions and the recesses.

A start portion and an end portion of the coil pattern may be formed wider than the portion forming the coil, and at least one throughhole and a soldering land surrounding the throughhole may be disposed.

The Hall sensor may be disposed at a position overlapping one of the radial direction pattern portions of the stator.

The slim-type stator according to an embodiment of the present disclosure may further include a driving circuit layer laminated on the lowermost PCB layer of the multilayer PCB and having a motor driving circuit mounted for applying a driving current to the coil pattern.

Also, the throughholes may be disposed between the inside of the fan-shaped coil patterns and between the fan-shaped coil patterns.

According to another aspect of the present disclosure, there is also provided a single-phase motor comprising: a rotor; a stator disposed opposite to the rotor and having a plurality of coil patterns formed on respective PCB layers of a multilayer printed circuit board (PCB) and connected via throughholes; a Hall sensor installed on the multilayer PCB of the stator and for detecting a magnetic pole of the rotor; and a dead point prevention yoke for setting the rotor such that the Hall sensor is positioned at a position deviated from a magnet interface of the rotor when the rotor is in an initial state, wherein the multilayer PCB comprises at least one protrusion corresponding to the plurality of the coil patterns and at least one recess disposed between the plurality of the coil patterns.

The dead point prevention yoke is stacked on a lower portion of the stator, and has an outer periphery of a polygonal shape of (the number of magnetic poles)/N where N is a divisor of the number of magnetic poles, the Hall sensor is installed at a position deviated by a ¼ magnetic pole width from the interface or the center of the magnetic pole when the rotor is in an initial state, and the Hall sensor may be disposed at a position overlapping one of the radial direction pattern portions of the stator.

According to another aspect of the present disclosure, there is also provided a cooling fan comprising: a lower case in which a ring portion having a penetration opening is connected to a main body through a plurality of bridges; a bearing supported by a bearing holder provided in the penetration hole of the ring portion; a rotor having a plurality of blades formed on an outer periphery thereof, and a plurality of magnets in which a rotating shaft is rotatably supported on the bearing; a stator disposed in the lower case so as to face the rotor, and having a plurality of coil patterns formed on respective PCB layers of a multilayer PCB and connected via throughholes, in which the penetration opening through which the bearing holder passes is formed at a center thereof; an upper case disposed opposite to the lower case, wherein the multilayer PCB comprises at least one protrusion corresponding to the plurality of the coil patterns and at least one recess disposed between the plurality of the coil patterns.

The plurality of bridges are formed in (the number of magnetic poles)/N where N is a divisor of the number of magnetic poles to set the rotor so that, when the rotor is in the initial state, the Hall sensor is positioned at a position deviated from the magnet interface of the rotor.

The Hall sensor may be disposed at a position deviated by a ¼ magnetic pole width from the interface of the magnetic poles or the center of the magnetic poles.

A space formed between the bridges of the lower case serves as a wind inlet, and diameter of the wind inlet may be larger than diameter of the PCB layer.

Each of the coil patterns may have a fan shape, for example, and may be spirally patterned to form a plurality of turns. The fan-shaped coil patterns may include: inner and outer rotating direction pattern portions disposed concentrically at intervals on an inner circumference and an outer circumference in the circumferential direction; and a pair of radial direction pattern portions both ends of which are arranged along the radial direction, and interconnect the inner rotating direction pattern portion and the outer rotating direction pattern portion. The rotor may be formed in a ring shape, and the width of the ring may be formed to be larger than at least the length of the radial direction pattern portion, and may be arranged to face the radial direction pattern portion.

The cooling fan according to an embodiment of the present disclosure may further include: a plurality of jumper wire pattern layers interposed between an uppermost PCB layer and a lowermost PCB layer of the multilayer PCB and interconnecting coil patterns disposed on different PCB layers; and a motor driving circuit layer mounted on the lowermost PCB layer to apply a driving current to a stator coil formed by the coil pattern.

According to another aspect of the present disclosure, there is also provided a cooling fan comprising: a lower case having at least one yoke protrusion protruding into a wind inlet; a bearing holder disposed at a part of the wind inlet and having an outer peripheral portion connected to the at least one yoke protrusion; a bearing supported by the bearing holder; a rotor having a plurality of blades formed on an outer periphery thereof, and a plurality of magnets in which a rotating shaft is rotatably supported on the bearing; a stator disposed on the bearing holder so as to face the rotor and having a plurality of coil patterns formed on respective PCB layers of a multilayer PCB and connected via throughholes; a Hall sensor disposed on the PCB layer of the slim-type stator and disposed at a position deviated from the interface of the rotor magnetic pole when the rotor is in the initial state to detect the magnetic pole of the rotor; an upper case disposed opposite to the lower case; and side walls connecting the upper case and the lower case, wherein the at least one yoke protrusion sets the rotor such that, when the rotor is in an initial state, the Hall sensor is positioned at a position deviated from the magnet interface of the rotor.

The t least one yoke protrusion may be formed in a number of (the number of magnetic poles)/N where N is a divisor of the number of magnetic poles.

The cooling fan according to an embodiment of the present disclosure further includes a plurality of support protrusions disposed between the yoke protrusions and protruding from the lower case into the wind inlet so as to support the bearing holder.

The at least one yoke protrusion may include a slot for increasing an area of engagement with the bearing holder.

Advantageous Effects

As described above, according to the embodiments of the present disclosure, torque generation can be maximized in an opposed rotor, and a passage of a wind inlet can be widely secured in a fan of a Sirocco type, so that an air volume can be increased.

In addition, in the present disclosure, a dead point prevention yoke function can be implemented without forming a separate dead point prevention yoke by forming bridges corresponding to the number of rotor magnetic poles while forming a wind inlet in a lower case.

That is, since the bridge formed in the lower case has a dead point prevention yoke function, when a separate dead point prevention yoke is used, a self-starting failure due to an error in the alignment between the Hall sensor and the yoke can be prevented from occurring.

Further, in the present disclosure, without using a dead point prevention yoke, a dead point prevention yoke function as well as maximizing maneuverability can be implemented by forming a dead point prevention protrusion protruding in a wind inlet provided in a lower case so as to minimize a starting torque of a fan, so that only a part of an outer periphery or an inner side of a magnetic force line of a magnet is used.

In addition, in the present disclosure, a dead point prevention yoke function can be implemented by using a separate dead point prevention yoke.

In addition, in the present disclosure, a stator coil for rotationally driving a rotor is implemented in a thin film form using a conductive pattern coil formed on a multilayer PCB, and a slim-type single-phase motor capable of improving productivity and attaining cost reduction can be realized. Thus, a slim-type cooling fan for various types of electronic devices can be provided by using the slim-type single-phase motor. Particularly, the cooling fan can be applied to a slim electronic device such as a wireless charger.

In addition, according to the present disclosure, since an axial type structure using a thin film type stator is employed, a space in which a core type stator used in a conventional radial type motor is removed and a space obtained by omitting a coil terminal connection portion are used so that the diameter of the sleeve bearing supporting the rotating shaft of the rotor can be expanded so as to contain sufficient oil, thereby improving reliability and durability.

In the present disclosure, a slim-type stator for a single-phase motor using a multilayer board (PCB), is implemented, in which, when coil patterns of respective PCB layers form a star-shaped pattern or a fan-shaped spiral pattern, for example, since a plurality of rotating direction pattern portions and a plurality of radial direction pattern portions are alternately arranged, the radial direction pattern portions are oriented in the radial direction from the center thereof so that a rotating force applied to the opposite rotor can be maximally obtained, thereby improving the efficiency of the motor. That is, the radial direction pattern portions are oriented in the radial direction, so that a tangential force is generated when the stator coil is energized, so that an effective torque can be obtained.

Further, in the present disclosure, a plurality of coil patterns of a multilayer PCB patterned in a helical pattern so as to form a plurality of turns can be connected in series, in parallel, or in series/parallel so that torque values and drive current values required for a single-phase motor.

According to the present disclosure, in the slim-type stator, the thicknesses of the coil patterns of each PCB layer are adjusted so that the start portion and the end portion are designed to be wider than the portions forming the coils (winding), for example, in the form of a tear drop, to thereby increase the reliability of connections.

That is, the start portion and the end portion of the coil pattern are formed in the form of a tear drop, and the throughholes and the soldering lands surrounding the throughholes are disposed to interconnect the coil patterns, or ease the connections to the wiring patterns and guarantee the reliability of the connections.

Further, in order to increase the reliability, at least one throughhole connecting the start portion and the end portion to each layer may be formed so as to prevent the reliability from being deteriorated due to the breakage of the wire or the badness of the throughhole.

BEST MODE

Figure 1:
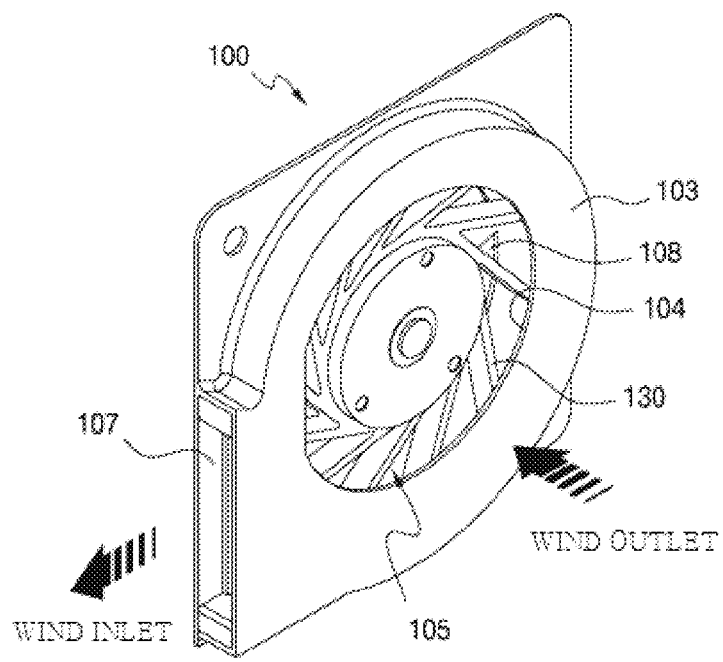
FIG. 1 is a perspective view showing a cooling fan using a slim-type single-phase motor implemented using a slim-type stator according to the present disclosure.

Hereinafter, embodiments of the present disclosure will be described in detail with reference to the accompanying drawings. The sizes and shapes of the components shown in the drawings may be exaggerated for clarity and convenience.

Figure 2:
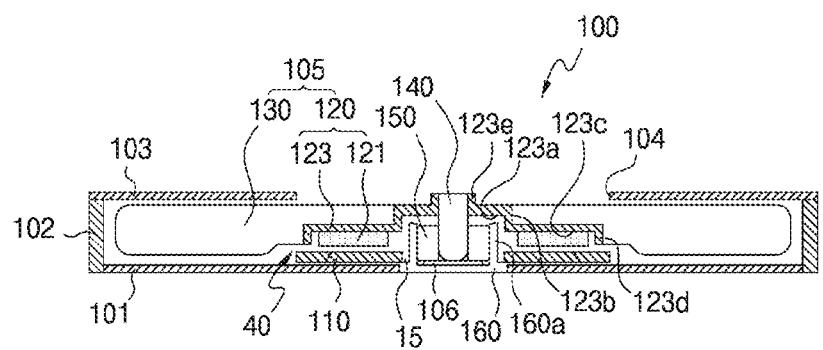
FIGS. 2 and 3 are axial cross-sectional views illustrating first and second embodiments of a slim-type cooling fan according to the present disclosure.

Referring to FIGS. 1 and 2, a cooling fan 100 using a slim-type single-phase motor according to an embodiment of the present disclosure includes a case formed by coupling an upper case 103 and a lower case 101 having a side wall 102 formed therein, and a slim-type single-phase motor 40 implemented using a slim-type stator 110 provided inside the case.

The single-phase motor 40 includes the slim-type stator 110, a sleeve bearing 150, a rotating shaft 140, and a rotor 120. A plurality of blades 130 are integrally formed on an outer surface of a back yoke 123 of the rotor 120 to constitute an impeller 105.

A bearing holder 160 for receiving a sleeve bearing 150 at a central portion of the lower case 101 is integrally formed by, for example, insert molding. The bearing holder 160 includes the sleeve bearing 150 inserted into a cylindrical protruded boss 160a.

In addition, a thrust plate (or a bearing seat) 106 is provided between the sleeve bearing 150 and the inner bottom surface of the bearing holder 160 to support the rotating shaft 140 of the rotor 120.

Figure 5:
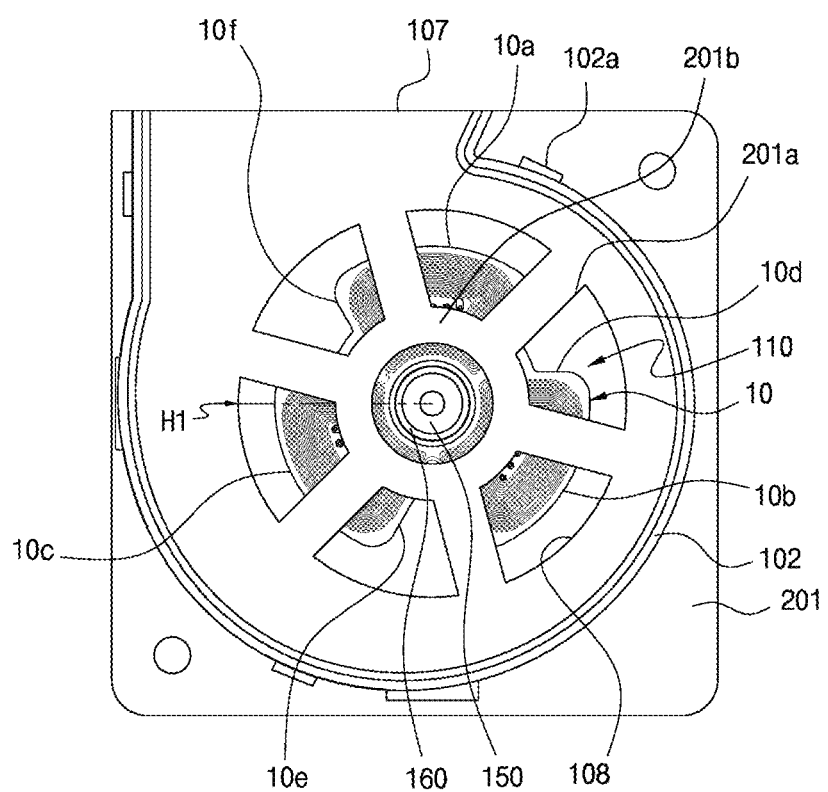
FIG. 5 is a plan view showing a state in which a slim-type stator is coupled to the lower case in FIG. 4.

The slim-type stator 110 according to the embodiment of the present disclosure as shown in FIG. 5 is mounted on a bottom surface of the lower case 101. The stator 110 has, at a central portion of the stator, a penetration opening 15 formed larger than an outer diameter of a boss 160a of a bearing holder 160.

The rotating shaft 140 of the rotor 120 is coupled to the penetration opening of the sleeve bearing 150 and the rotating shaft 140 is fixed to the center of the rotor 120.

The rotor 120 includes a circular back yoke 123 made of a magnetic material and a plurality of magnets 121 attached to the inner surface of the back yoke 123 so as to serve as a magnetic path, and a single-phase motor 40 is arranged in an axial type structure that the magnets 121 are arranged on the coil of the rotor 110 in a face-to-face fashion.

It is preferable that the plurality of magnets 121 are arranged such that N-poles and S-poles are alternately arranged and the number of magnetic poles is the same as the number of the radial direction pattern portions 20g through 20l of the coil pattern 21. Accordingly, the single-phase motor 40 constructed using the stator of FIG. 8 has a six-slot/six-pole structure.

The back yoke 123 includes, at a center of the back yoke 123, a coupling portion 123e having a penetration opening through which the rotating shaft 140 is fixed, and protrudes outward.

The back yoke 123 has a first cylindrical portion 123b which has a first end receiving groove 123a formed on the inner side and is formed larger than the outer diameter of the boss 160a of the bearing holder 160, and a second cylindrical portion 123d which has a second end receiving groove 123c formed on the outer side and is formed in a size corresponding to the stator 110. A stepped portion is formed in an intermediate portion between the first cylindrical portion 123b and the second cylindrical portion 123d so as to form a receiving groove having a two-stage structure.

The bearing holder 160 is accommodated in the first end accommodating groove 123a of the back yoke 123 and a plurality of magnets 121 are installed in the second end accommodating groove 123c in correspondence with the coil pattern 21 of the stator 110.

The plurality of magnets 121 may be formed of a structure of N-poles and S-poles by split magnetization using a rare-earth magnet or a ferrite magnetic substance having a large coercive force such as Nd alloy or Co alloy, or may be used by fixing disk-shaped Nd magnets to a rotor support with an adhesive.

A plurality of blades 130 are integrally formed on the outer surface of the back yoke 123 of the rotor 120 by insert molding to constitute an impeller 105. In this case, the blades 130 extend to the same level as the first cylindrical portion 123b while surrounding the outer surface of the stepped portion 123b of the back yoke 123 and the second end receiving groove 123c. The plurality of blades 130 may extend from the back yoke 123 at an inclination angle or may extend in the radial direction as shown in FIG. 1.

Further, the lower case 101 may include a through slot formed so that a connector or a cable necessary for applying power and control signals from a system body is coupled to the stator 110, and a wind inlet 108 including at least one penetration opening formed so as to suck the heated air inside the main body (for example, a wireless charger or the like) from a direction facing the lower case 101.

As shown in FIG. 1, the lower case 101 includes a side wall 102 formed at right angles to the outer circumferential portion thereof and is joined together with the upper case 103 to form a Sirocco type fan, and thus, one side of the side wall 102 is opened to form a wind outlet 107 for blowing out the sucked air. In this case, the side walls 102 are formed of the same resin as the bearing holder 160 and is integrally formed with the lower case 101 made of metal by insert molding.

However, the side walls 102 may be formed by insert molding together with the upper case 103 instead of the lower case 101.

The upper case 103 is also provided with a wind inlet 104 having at least one penetration opening for sucking the heated air inside the main body (for example, an electronic component such as a wireless charger or the like) from a direction opposite to the upper case 103, similarly to the lower case 101.

The cooling fan 100 according to the embodiment of the present disclosure is an example in which the wind inlets are formed in both the upper case 103 and the lower case 101, respectively, as shown in FIG. 1, but it is possible to form a wind inlet 104 in one of the upper case 103 and the lower case 101, for example, it is also possible that the wind inlet 104 is formed only in the upper case 103.

In addition, the cooling fan 100 according to the embodiment of the present disclosure may be configured to be of an axial flow type which is introduced from one side of the upper case 103 and the lower case 101 and discharged to the other side, depending on the blade shape of the impeller 105, without forming the penetration openings in all the side walls 102, instead of forming the wind outlet 107 at one side of the side wall 102.

The cooling fan 100 of the embodiment of the present disclosure configured as described above employs a single-phase motor 40 as an axial type structure and is configured to include a thin film slim-type stator as the single-phase motor. As a result, the cooling fan 100 of the embodiment of the present disclosure can be implemented as a slim cooling fan 100 because of realizing a single-phase motor 40 having a slimmer structure than a conventional fan motor using a core-type stator.

In addition, the cooling fan 100 according to the embodiment of the present disclosure has a structure in which the diameter of a sleeve bearing 150 that supports the rotating shaft 140 of the rotor 120 can be extended to contain sufficient oil by utilizing a space that is obtained by removing a core type stator used in a conventional radial type motor.

Figure 3:
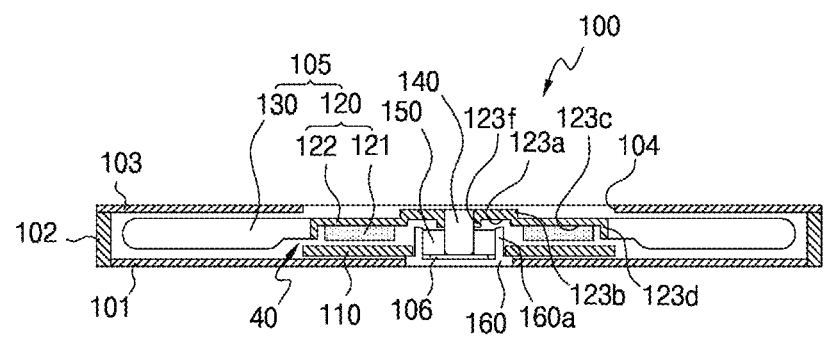

Referring to FIG. 3, the second embodiment of the present disclosure differs from the first embodiment only in the structure of the rotor and the impeller, and the former is the same as the latter, in view of the other parts. Therefore, a description thereof will be omitted.

In the second embodiment, the back yoke 122 of the rotor 120 includes, at the center thereof, a coupling portion 123f having a penetration opening through which the rotating shaft 140 is fixed, and which protrudes inward.

The back yoke 122 has a first cylindrical portion 123b which has a first end receiving groove 123a formed on the inner side and is formed larger than the outer diameter of the boss 160a of the bearing holder 160, and a second cylindrical portion 123d which has a second end receiving groove 123c formed on the outer side and is formed in a size corresponding to the stator 110. A stepped portion is formed in an intermediate portion between the first cylindrical portion 123b and the second cylindrical portion 123d so as to form a receiving groove having a two-stage structure.

The bearing holder 160 is accommodated in the first end accommodating groove 123a of the back yoke 122 and a plurality of magnets 121 are installed in the second end accommodating groove 123c in correspondence with the coil pattern 21 of the stator 110.

The back yoke 122 of the rotor 120 has a coupling portion 123f having a penetration opening through which the rotating shaft 140 is fixed and which protrudes inward and thus the length of the sleeve bearing 150 is set to a reduced length by the inwardly protruding length of the coupling portion 123f as compared with the first embodiment.

A plurality of blades 130 integrally formed by insert molding on the outer surface of the back yoke 123 so as to constitute the impeller 105 in the first embodiment are extendibly formed in the same level as the second cylindrical portion 123d, while surrounding the second end receiving groove 123c of the back yoke 123.

However, the blades 130 according to the second embodiment are set to have a narrow width as compared with the blades according to the first embodiment and the exposed surface (that is, the uppermost end) of the back yoke 122 and the rotating shaft 140 are set lower than the upper case 103, or in substantially the same level as the upper case 103. As a result, the heights of the side walls 102 between the upper case 103 and the lower case 101 can be lowered.

Therefore, the cooling fan 100 according to the second embodiment of the present disclosure forms the coupling portion 123f of the back yoke 122 inwardly and at the same time, the thickness of the entire cooling fan 100 can be more slimly designed by lowering the heights of the sleeve bearing 150, the rotating shaft 140, the blades 130 and the side walls 102.

Figure 4:
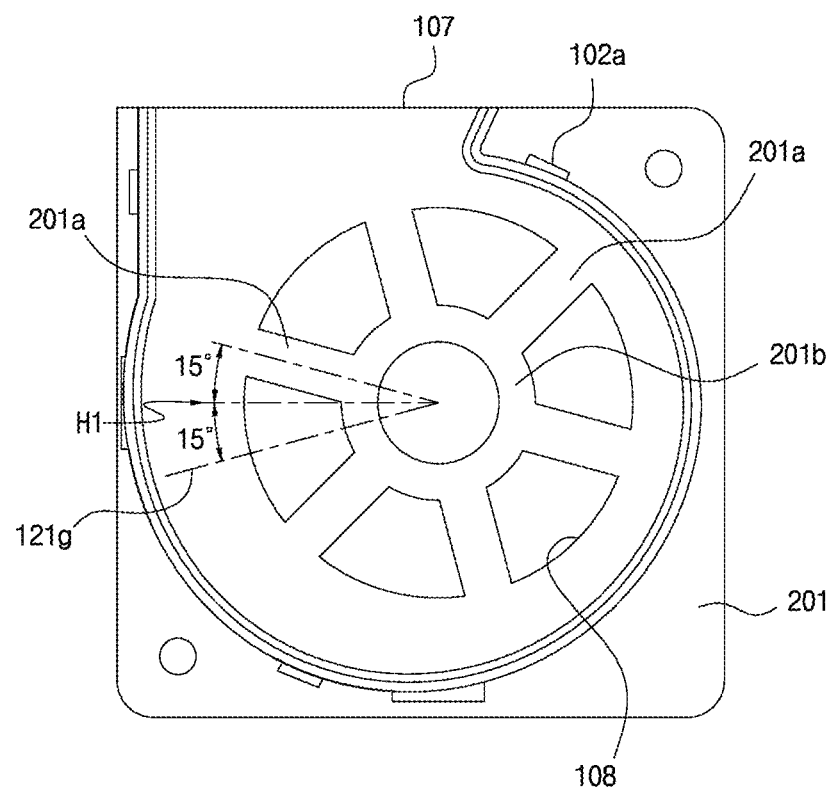
FIG. 4 is a plan view showing a lower case having a dead point prevention yoke function according to the present disclosure.
Figure 6:
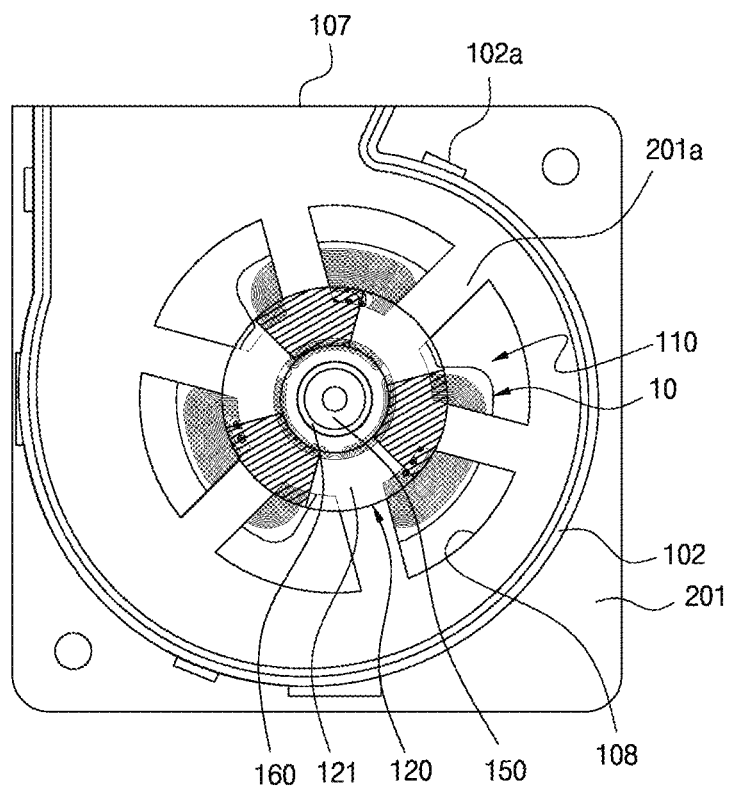
FIG. 6 is a plan view showing a state where the rotor is coupled to the stator in FIG. 5.
Figure 7:
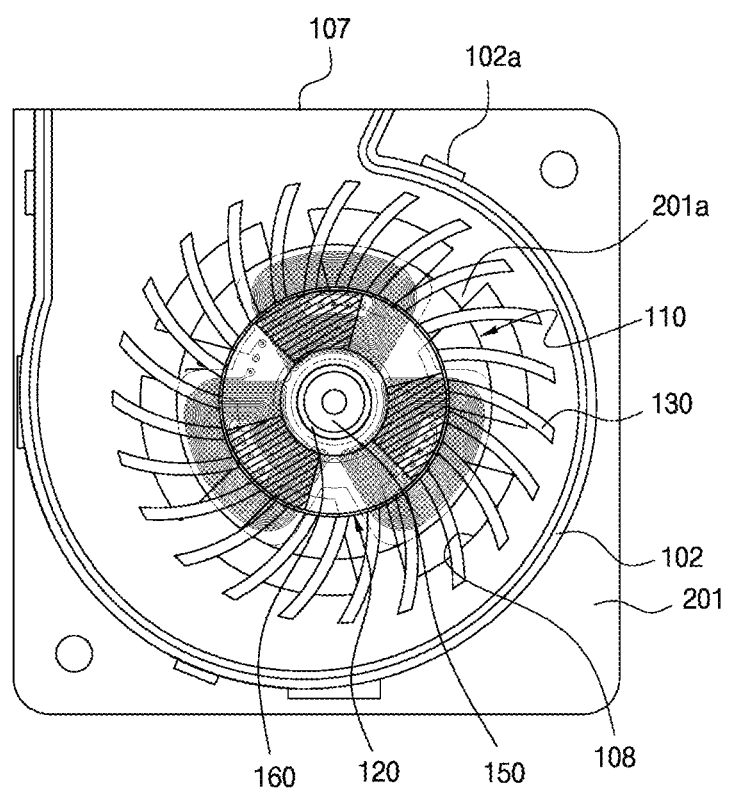
FIG. 7 is a plan view showing a state where blades are coupled to the rotor in FIG. 6.

FIG. 4 is a plan view showing a lower case having a dead point prevention yoke function according to the present disclosure. FIG. 5 is a plan view showing a state in which a slim-type stator is coupled to the lower case in FIG. 4. FIG. 6 is a plan view showing a state where the rotor is coupled to the stator in FIG. 5. FIG. 7 is a plan view showing a state where blades are coupled to the rotor in FIG. 6. In FIG. 6, the rotor is coupled to the lower portion of the stator, but is superimposed on the lower case for convenience of explanation.

Referring to FIGS. 4 to 7, the cooling fan 100 according to the present disclosure is configured to have a dead point prevention yoke function in the lower case 201 in the first and second embodiments.

The lower case 201 uses a soft magnetic material having a low coercive force such as silicon steel or pure iron to serve as a yoke and is connected to a central annular ring portion 201*b* via bridges of a number corresponding to the number of the magnetic poles of the rotor 120, for example, six bridges 201*a* to have a function of dead point prevention yoke.

The lower case 201 may be formed in a square shape, for example, and one side where the side wall 102 is not formed forms the wind outlet 107 when the upper case 103 is coupled to the lower case 201.

In this case, a penetration opening 15 is formed at the center of the annular ring portion 201*b* so that the bearing holder 160 can pass through the penetration opening 15.

In FIGS. 4 to 7, the number of bridges 201*a* formed in the lower case 201 is equal to the number of magnetic poles of the rotor 120. However, the number of bridges 201*a* formed in the lower case 201 is not only the number corresponding to the number of magnetic poles of the rotor 120 on a one-to-one basis but also (the number of magnetic poles)/N where N is a divisor of the number of the magnetic poles of the rotor. When the rotor is in an initial state (i.e., in a stopped state), the center of one of the magnetic poles of the rotor coincides with a bridge, in the case that there is one bridge. When there are two bridges, they are arranged at intervals of 180 degrees. When there are three bridges, they are arranged at intervals of 120 degrees. When the rotor is in the initial state, the bridges coincide with the centers of the magnetic poles, respectively.

When the bridges 201*a* corresponding to the number of magnetic poles of the rotor 120 are formed in the lower case 201 made of a soft magnetic material capable of serving as a yoke as described above, the center of each magnet 121 is positioned between the magnet 121 and the bridge 201*a* of the rotor 120 by the magnetic phenomenon while being opposed to the bridge 201*a* in an initial (stopped) state of the rotor 120, as shown in FIGS. 6 and 7.

Figure 8:
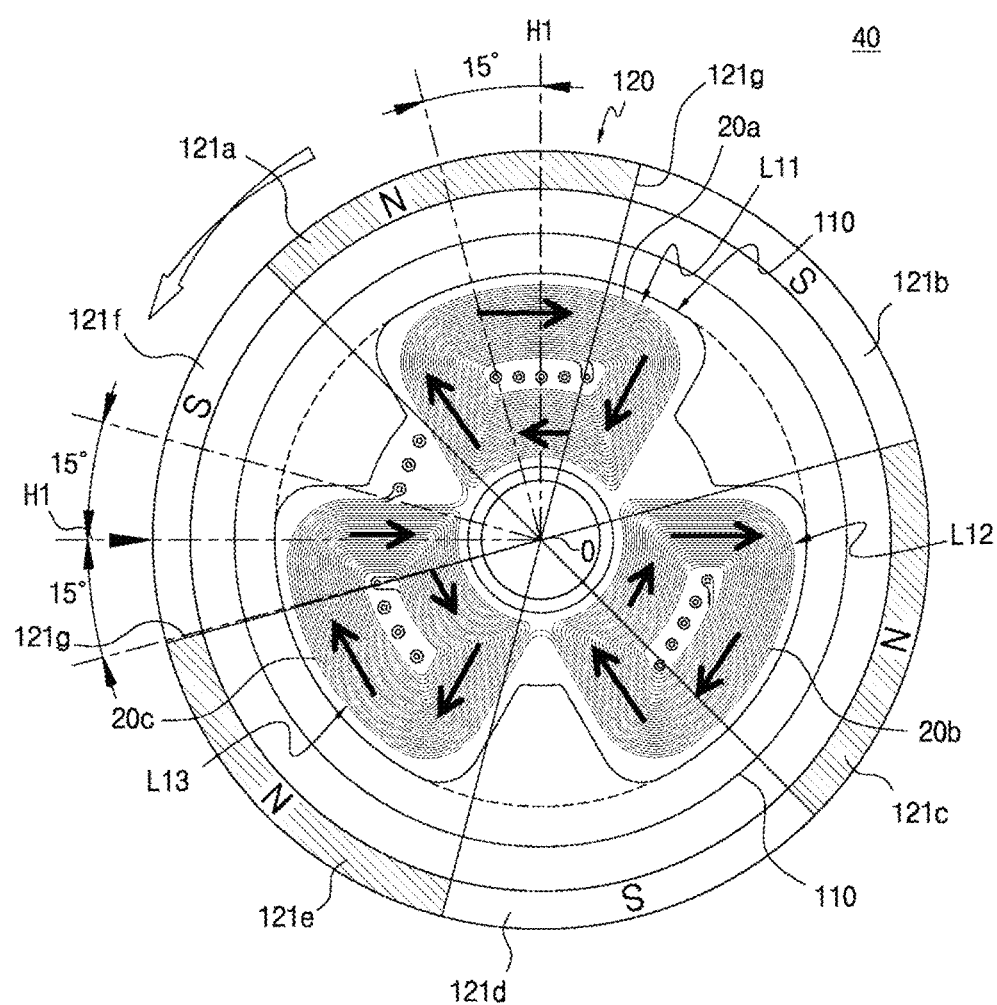
FIG. 8 is an explanatory view for explaining the arrangement relationship among a rotor, a stator and a Hall sensor to prevent a dead point when a single-phase motor is in an initial state according to the present disclosure.

Therefore, the Hall sensor H1 for detecting the magnetic pole of the rotor in consideration of the initial state of the rotor 120 is installed on the stator 110, that is, the PCB 10 at a position deviated by a ¼ magnetic pole width (15° in the case of a six-pole rotor) or a ¾ magnetic pole width from a magnetic pole interface 121*g* and a center of the magnet 121 as shown in FIGS. 4, 5, and 8.

Here, the stator 110 shown in FIG. 8 is formed by stacking the first to sixth PCB layers 11 to 16 and only the first PCB layer 11 is exposed in the drawing, and the second to sixth PCB layers 12 to 16 perform the same functions as those of the first PCB layer 11, so a description thereof will be omitted.

The reason why the Hall sensor H1 is disposed at a position shifted by ¼ magnetic pole width from the interface 121*g* of the magnetic pole is that the magnetic flux generated from each magnet 121 at this point is maximum, and thus the rotor position detection signal of the best sensitivity can be generated by the Hall sensor H1.

In addition, in consideration of the continuous rotation due to the moment of inertia of the rotor, the position of the Hall sensor H1 ranges from the position deviated by the ¼ magnetic pole width from the magnetic pole interface 121*g* to "0°", that is, the magnetic pole interface 121*g*. The position shifted by ¼ magnetic pole width from the interface 121*g* of the magnetic pole is the same as the position shifted by ¼ magnetic pole width from the center of the bridge 201*a*.

In addition, the Hall sensor H1 is disposed at a position deviated by a ¼ magnetic pole width (15° in the case of a six-pole rotor) from the interface 121*a* of the magnetic poles and at the same time, it is preferable to set one radial direction pattern portion 20*l* of the radial direction pattern portions 20*g* to 20*l* of the coil patterns L11 to L13 to face the Hall sensor H1 in the slim-type stator 110.

As shown in FIG. 8, the Hall sensor H1 coincides with one radial direction pattern portion 20*l* of the radial direction pattern portions 20*g* to 20*l*. When the driving power is applied to the motor driving circuit 30 to start the rotor 120 in a state in which the Hall sensor H1 is disposed at a point where the magnetic pole is at a ¼ magnetic pole width away from the interface 121*g* of the magnetic poles, the magnetic pole of one magnet 121*f* facing the Hall sensor H1 is detected with high sensitivity. Accordingly, since the radial direction pattern portion 20*l* is opposed to the point where the magnetic flux generated from the magnet 121*f* is the maximum, the self-starting is performed more easily.

Further, when the rotor 120 is in an initial (stopped) state, the centers of the respective magnets 121 stay at positions opposite to the bridge 201*a*. Therefore, when the rotation direction of the rotor 120 is counterclockwise (CCW) as shown in FIG. 8, it is preferable that the Hall sensor H1 is installed at a position deviated by a ¼ magnetic pole width in the counterclockwise direction from the center of the bridge 201*a*. When the rotation direction is clockwise (CW), the hall sensor H1 is installed at a position deviated by a ¼ magnetic pole width in the clockwise direction from the center of the bridge 201*a*, thereby preventing a self-starting failure phenomenon.

If the above condition is satisfied, the Hall sensor H1 and the radial direction pattern portion 20*l* are opposed to each other at a point where the magnetic flux generated from each magnet 121 is at maximum when the rotor 120 is started, so that the self-starting can be performed more easily.

As a result, the six bridges 201*a* formed in the lower case 201 have the dead point prevention yoke function, and the space between the bridges 201*a* serves as the wind inlet 108.

In this case, the magnets 121 of the rotor 120 are formed in a ring shape and are multipolar magnetized so that N-poles and S-poles are alternately arranged, and the width of the ring is formed greater than at least the length of the radial direction pattern portions 20*g* to 20*l*. Also, the magnets 121 of the rotor 120 are preferably disposed so as to face the radial direction pattern portions 20*g* to 20*l*.

Further, it is preferable that the space between the bridges 201*a* formed in the lower case 201 and serving as the wind inlet 108 is formed larger than the multilayer PCB 10 of the stator 110 installed in the lower case. That is, the diameter of the wind inlet 108 blanked to form each of the bridges 201*a* is formed larger than the diameter of the PCB 10.

In FIG. 7, a reference numeral 102*a* denotes a snap coupling portion which is integrally formed on the side wall and used when snap-engaged with the upper case 103.

Figure 9A:
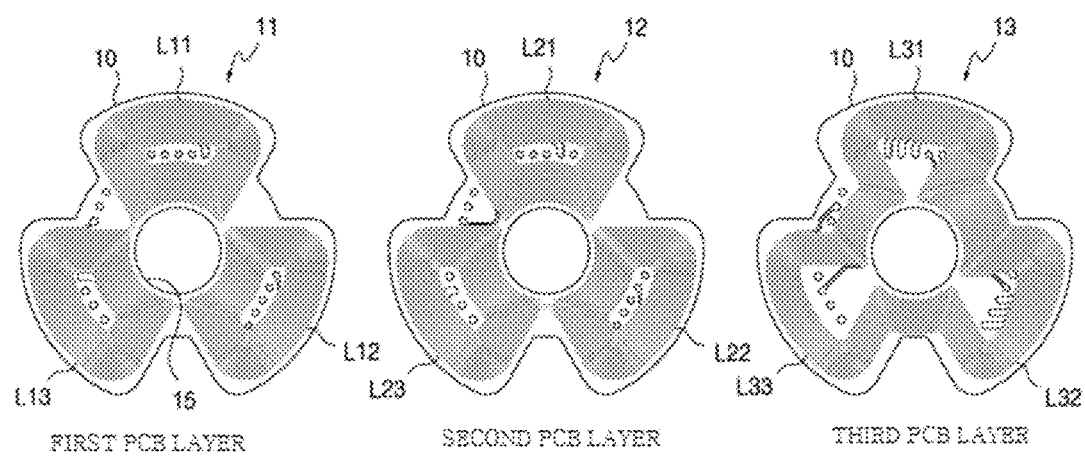
FIGS. 9A and 9B are development views showing, in two sheets of drawings, six-layer coil patterns of a slim-type stator according to the present disclosure.
Figure 9B:
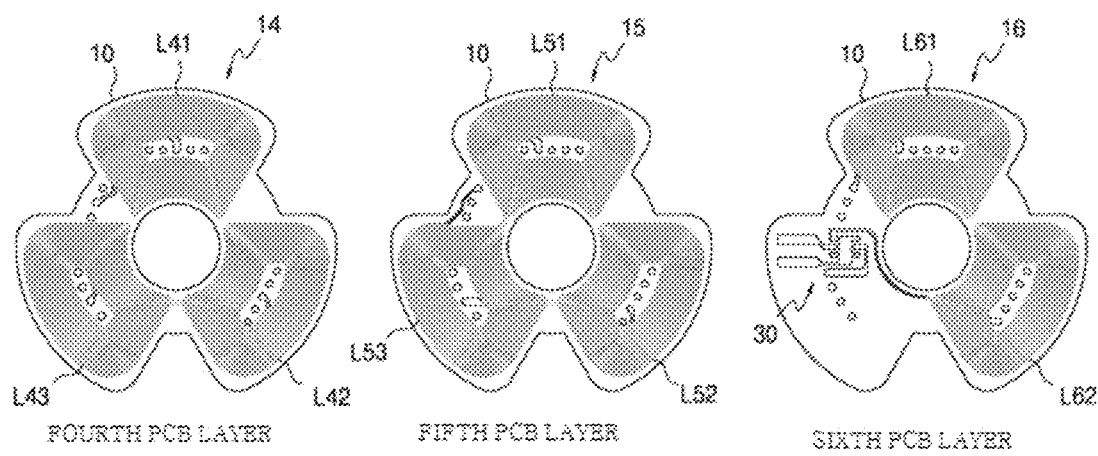
Figure 10:
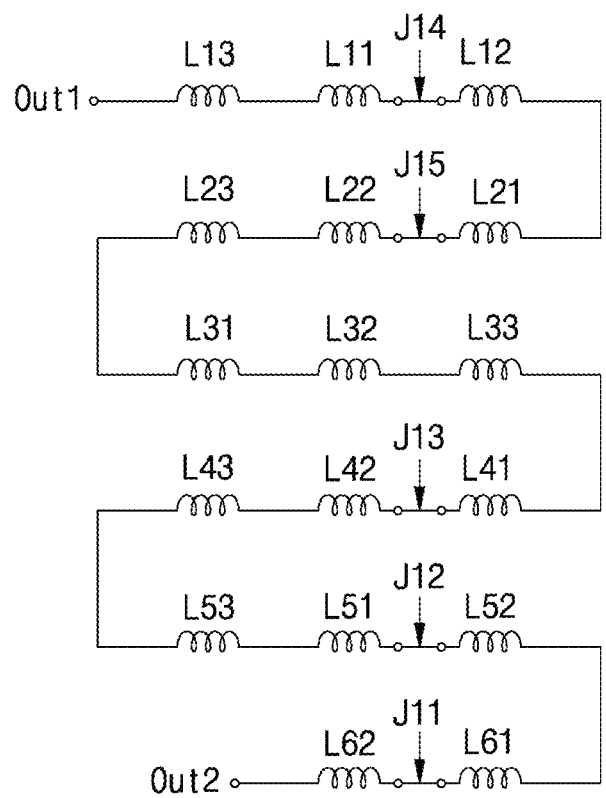
FIG. 10 is an equivalent circuit diagram obtained by serially connecting six-layer coil patterns of the slim-type stator shown in FIGS. 9A and 9B according to the present disclosure.

FIG. 8 is an explanatory view for explaining the arrangement relationship among a rotor, a stator and a Hall sensor to prevent a dead point when a single-phase motor is in an initial state according to the present disclosure. FIGS. 9A and 9B are development views showing, in two sheets of drawings, six-layer coil patterns of a slim-type stator according to the present disclosure. FIG. 10 is an equivalent circuit diagram obtained by serially connecting six-layer coil patterns of the slim-type stator shown in FIGS. 9A and 9B according to the present disclosure. Further FIGS. 12 to 17 are development views respectively showing six-layer coil patterns of a slim-type stator according to the present disclosure.

Referring to FIGS. 8 to 17, the slim-type stator 110 for a single-phase motor according to the present disclosure is formed by patterning a copper foil of a multilayer PCB in which each PCB layer is made of a copper clad laminate (CCL), in which, for example, first to sixth PCB layers 11 to 16 are stacked and integrated.

The slim-type stator 110 is formed by stacking the multilayer PCB of which each PCB layer has the same shape, and has a plurality of coil patterns L11-L13, L21-L23, L31-L33, L41-L43, L51-L53, and L61-L62 formed of a helical conductive pattern obtained by patterning a copper foil on a plurality of PCB layers of the multilayer PCB 10.

The coil patterns L11-L13 and L51-L53 of the first and fifth PCB layers 11 and 15 are formed in three fan-like shapes, respectively, and separated from each other at intervals of 60 degrees with respect to the center point O, and the coil patterns L21-L23 and L41-L43 of the second and fourth PCB layers 12 and 14 also have three fan-like shapes and are separated from each other at intervals of 60 degrees with respect to the center point O. Each coil pattern has the same shape at the same position.

According to a difference between the coil patterns L11-L13 and L51-L53 of the first and fifth PCB layers 11 and 15, two coil patterns L11, L13, L51, and L53, for example, among the three coil patterns formed on each PCB layer, are mutually connected at the time of patterning, and the remaining one coil pattern L12 and L52 are separated from each other and then are connected in series via the fourth and second jumper wire patterns J14 and J12, respectively.

In addition, the coil patterns L21-L23 and L41-L43 of the second and fourth PCB layers 12 and 14 have a structure in which two coil patterns L22 and L23; or L42 and L43 are mutually connected at the time of being patterned, and the remaining one coil pattern L21; or L41 is formed separately and connected in series through the fifth and third jumper wire patterns J15 and J13, respectively.

However, the coil patterns L31 to L33 of the third PCB layer 13 perform the same role as the coil patterns L11 to L13, L21-L23, L41-L43, and L51-L53 of the first, second, fourth, and fifth PCB layers 11, 12, 14, and 15, as will be described later, but are interconnected to form a large, e.g., star-shaped zigzag shape having three protrusions and three recesses spaced by 60 degrees apart from the center O, instead of three fan-shaped shapes.

The coil patterns L11-L13, L21-L23, L41-L43 and L51-L53 of the first, second, fourth and fifth PCB layers 11, 12, 14, and 15 and the coil pattern L31-L33 of the third PCB layer 13 are obtained by patterning a copper foil laminated on the respective PCB layers so as to form a plurality of turns required to constitute a stator coil, and are wound in a helical shape from the inside to the outside or from the outside to the inside in the clockwise (CW) direction.

The coil patterns L31-L33 of the third PCB 13 are formed differently from the coil patterns L11-L13, L21-L23, L41-L43, and L51-L53 of the first, second, fourth, and fifth PCB layers 11, 12, 14, and 15 in order to secure a space for forming the first to fifth jumper wire patterns J11 to J15 necessary for interconnecting the plurality of coil patterns.

A plurality of throughholes T11 to T27 plated with a conductive metal in penetration holes formed by penetrating the multilayer of PCB 10 are used to interconnect the coil patterns of the respective PCB layers.

The multilayer PCB 10 may be made of an insulating resin such as FR-4 or CEM-3 made of a glass epoxy laminate, for example, as a PCB material. The multilayer PCB 10 has a structure in which a copper foil is stacked on each PCB layer, and any insulating resin can be used as the material of the PCB as long as a multilayer printed circuit board (PCB) can be formed. The number of layers of the PCB to be stacked can be set within a range of one to ten layers in proportion to a desired RPM of a single-phase motor. It is necessary to increase the number of PCB layers to be stacked, so that the coil patterns L11-L13, L21-L23, L31-L33, L41-L43, L51-L53 and L61-L62 are used since a large number of coil turns is required so as to obtain a high torque value, and is not limited to the number of stacked layers.

In the case of using a multilayer PCB in which a plurality of PCB layers are stacked, the lowermost PCB layer is formed with a printed wiring 17 for interconnecting a coil pattern and an electronic component, and a single-chip integrated circuit (IC) 16 necessary for driving a single-phase motor is mounted on the printed wiring 17 to form a motor driving circuit 30. In addition, driving power is connected externally to the power supply terminal Vbb and the ground pattern GND of the printed wiring 17.

In the case that a high RPM is not required, the stator for a single-phase motor according to the present disclosure may be constructed by using a double-sided PCB having a copper foil laminated on both sides of the multilayer PCB 10. In this case, the coil pattern may be formed on one surface of the multilayer PCB 10 and the motor driving circuit 30 may be mounted on the other surface of the multilayer PCB 10.

The coil patterns L11-L13, L21-L23, L41-L43, and L51-L53 of the first, second, fourth, and fifth PCB layers 11, 12, 14, and 15 have three fan-shaped shapes in common, respectively, and include a plurality of inner and outer rotating direction pattern portions 20*a*-20*f*, 22*a*-22*f*, 24*a*-24*f*, and 25*a*-25*f* arranged along the circumferential direction with an interval between the inner circumference and the outer circumference, and a plurality of radial direction pattern portions 20*g*-20*l*, 22*g*-22*l*, 24*g*-24*l*, 25*g*-25*l*, and 26*g*-26*j* disposed in the radial direction from the center O while interconnecting the inner rotating direction pattern portions and the outer rotating direction pattern portions, respectively.

In this case, the outer rotating direction pattern portion may be longer than the inner rotating direction pattern portion so that the plurality of radial direction pattern portion interconnect the inner rotating direction pattern portion and the outer rotating direction pattern portion along the radial direction from the center O thereof, respectively.

The coil patterns L31-L33 of the third layer PCB 13 also have a large shape, for example, a star shape. However, the coil patterns L31 to L33 of the third PCB layer 13 also have six inner and outer rotating direction pattern portions 23a-23f, and six radial direction patterns 23g-23l.

Further, coil patterns L61 and L62 having two fan-like shapes are disposed in the remaining space of the sixth PCB layer 16 except for an area required for mounting the motor driving circuit 30, and is provided for maximum reinforcement of the driving torque of the single-motor. The coil patterns L61 and L62 are composed of four inner and outer rotating direction pattern portions 26a, 26b, 26d and 26e and four radial direction pattern portions 26g to 26j.

In the embodiment shown in FIG. 8, each of the PCB layers (excluding the lowermost PCB layer) has a plurality of inner and outer rotating direction pattern portions and a plurality of radial direction pattern portions, the number of which each is six equal to the number of magnetic poles of the rotor.

The plurality of coil patterns L11 to L62 are connected as shown in FIG. 10 so that the radial direction pattern portions of the coil patterns L11-L13, L21-L23, L31-L33, L41-L43, L51-L53 and L61-L62 of the first to sixth PCB layers 11-16 have the same flow directions of the currents when a current is applied from the motor driving circuit 30.

As in an equivalent circuit shown in FIG. 10, the stator 110 of the present disclosure exemplifies that the 17 coil patterns L11 to L62 are connected in series in order to reduce the consumed electric power. However, it is of course possible to perform parallel connection of the 17 coil patterns L11 to L62 so that a large driving current can flow by lowering the resistance value of the coil in order to increase the torque. In addition, serial connection and parallel connection may be mixed as required.

In the present disclosure, a plurality of throughholes T11 to T27 are distributed and arranged in an inner minimum space of the coil patterns L11-L13, L21-L23, L41-L43, and L51-L53 having fan-like shapes of the first, second, fourth and fifth PCBs 11, 12, 14, and 15 and an outer space of the coil patterns L11-L13, L21-L23, L41-L43 and L51-L53, and the coil patterns of the multilayer PCB can be connected in series or parallel, by using the first to fifth jumper wire patterns J11415, without using a separate wiring pattern PCB.

In the following description of the embodiment, as shown in FIGS. 9A and 9B and FIGS. 12 to 17, the stator 110 made of the multilayer PCB which is made by stacking first to sixth PCB layers 11 to 16 of a six-layer structure will be described in detail as an example.

The coil patterns L11-L13, L21-L23, L41-L43, and L51-L53, which form three fan-shaped patterns, are formed on the upper surfaces of the first, second, fourth, and fifth PCB layers 11, 12, 14, and 15, respectively. The third PCB layer 13 includes coil patterns L31 to L33, in which three fan-like shapes are connected to each other to form a large star shape. The two fan-shaped coil patterns L61 and L62 are separately formed on the upper and right sides of the sixth PCB layer 16 of the lowermost layer, respectively, and the motor driving circuit 30 is mounted on the left side of the sixth PCB layer 16.

Each of the PCB layers 11 to 16 may be selected from PCB layers having a variety of thicknesses, for example, 0.4 mm and 0.8 mm. The coil patterns L11-L13, L21-L23, L31-L33, L41-L43, L51-L53 and L61-L62 applied to this embodiment are formed by finely patterning a conductive metal such as a copper (Cu) foil, and for example, a pattern width is 0.12 mm, and a distance between adjacent patterns is 0.13 mm. The width of the coil pattern and the distance between the patterns can be increased or decreased as needed.

In the first PCB layer 11, the start portion S11 is disposed inside the coil pattern L13 and the end portion E11 is disposed inside the coil pattern L11, so that the coil pattern L13 is formed so as to have a helical shape in the clockwise (CW) direction from the inside to the outside, and the coil pattern L11 is formed so as to have a helical shape in a clockwise (CW) direction from the outside to the inside. The coil pattern L12 includes a start portion S12 disposed inside the coil pattern L12 so as to form a helical shape in a clockwise (CW) direction from the inside to the outside, and an end portion E12 disposed outside the coil pattern L12, which extends to a space between the coil pattern L11 and the coil pattern L13.

A start portion S51 is disposed inside the coil pattern L53 and an end portion E51 is disposed inside the coil pattern L51, so that the coil patterns L51 to L53 of the fifth PCB layer 15 are formed in the same manner as the coil patterns L11 to L13 of the first PCB layer 11 so as to form a helical shape in the clockwise (CW) direction, and In the case of the coil pattern L52, a start portion S52 is disposed inside the coil pattern L52 and an end portion E52 that is disposed outside the coil pattern L52 extends to space between the coil pattern L51 and the coil pattern L53.

A start portion S21 is disposed in a space between the coil pattern L21 and the coil pattern L23 which are outside the coil pattern L21 and an end portion E21 is disposed inside the coil pattern L21, so that the coil pattern L21 of the second PCB Layer 12 forms a helical shape in the clockwise (CW) direction from the outside to the inside. A start portion S22 is disposed inside the coil pattern L22 and an end portion E22 is disposed inside the coil pattern L23, so that the coil pattern L22 is formed so as to have a helical shape in the clockwise (CW) direction from the inside to the outside and the coil pattern L23 is formed so as to have a helical shape in the clockwise (CW) direction from the outside to the inside.

A start portion S41 is disposed in a space between the coil pattern L41 and the coil pattern L43 at an outside of the coil pattern L41, an end portion E41 is disposed inside the coil pattern L41, a start portion S42 is disposed inside the coil pattern L42, and an end portion E42 is disposed inside the coil pattern L43, so that the coil patterns L41 to L43 of the fourth PCB layer 14 are formed so as to form a helical shape in the clockwise (CW) direction in the same manner as the coil patterns L21 to L23 of the second PCB layer 12.

A start portion S31 is disposed inside the coil pattern L33 and an end portion E31 is disposed in a space between the coil pattern L31 and the coil pattern 33, so that the coil pattern L31-L33 of the third PCB layer 13 is integrated to have a helical shape in the clockwise (CW) direction from the inside to the outside. Typically, the coil patterns L31-L33 of the third PCB layer 13 has a zigzag shape so as to have three protrusions and three recesses to form a substantially star shape.

In addition, a first jumper wire pattern for connecting the coil pattern L61 and the coil pattern L62 on the sixth PCB layer 16, a second jumper wire pattern J12 for connecting the coil pattern L51 and the coil pattern L52 on the fifth PCB layer 15, a third jumper wire pattern J12 for connecting the coil pattern L41 and the coil pattern L41 on the fourth PCB layer 14, a fourth jumper wire pattern J14 for connecting the coil pattern L11 and the coil pattern L12 on the first PCB layer 11 and a fifth jumper wire pattern J15 for connecting the coil pattern L21 and the coil pattern L22, are arranged at intervals in the inside of the coil patterns L31 and L32 of the third PCB layer 13.

A start portion S61 is disposed outside the coil pattern L61 and an end portion E61 is disposed in the inside of the coil pattern L61 so that the coil pattern L61 of the lowermost sixth PCB layer 16 forms a helical shape in the clockwise (CW) direction from the outside to the inside.

A start portion S62 is disposed inside the coil pattern L62 and an end portion E62 is disposed outside the coil pattern L62 so that the coil pattern L62 forms a helical shape in a clockwise (CW) direction from the inside to the outside. The end portion E62 extends to a left space of the coil pattern L61 and is connected to a second output terminal Out2 of the motor driving circuit 30.

Figure 11:
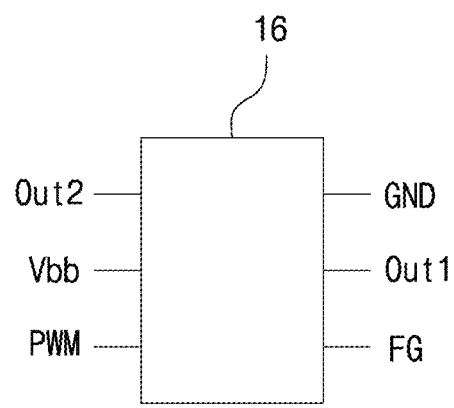
FIG. 11 is a plan view for explaining respective terminals of an integrated circuit employed in a single-phase motor driving circuit according to the present disclosure.
Figure 12:
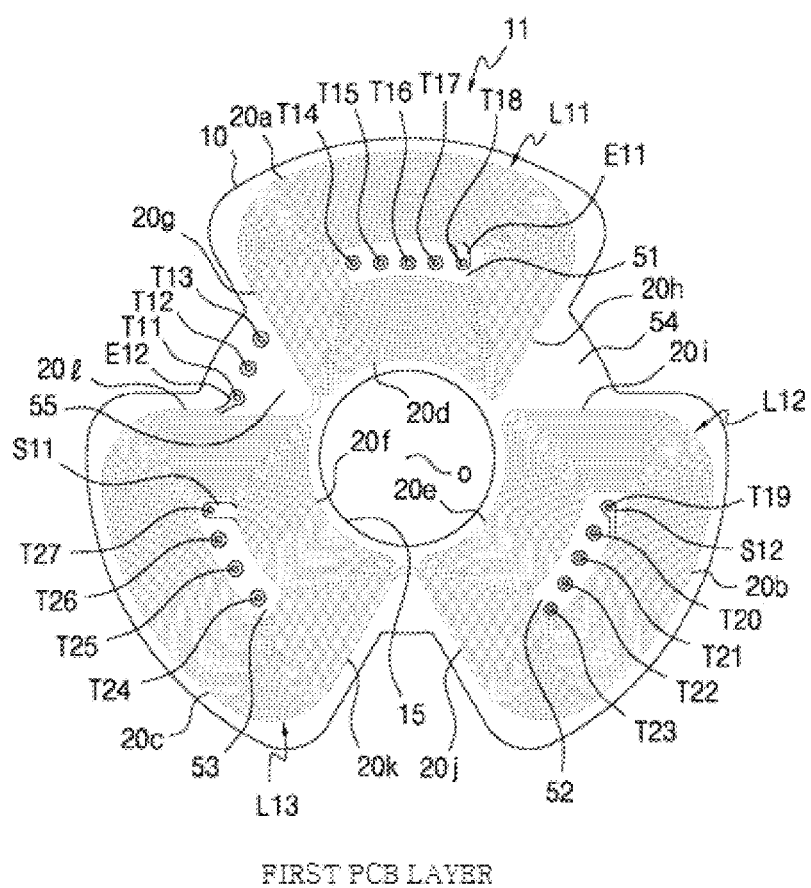
FIGS. 12 to 17 are development views respectively showing six-layer coil patterns of a slim-type stator according to the present disclosure.
Figure 13:
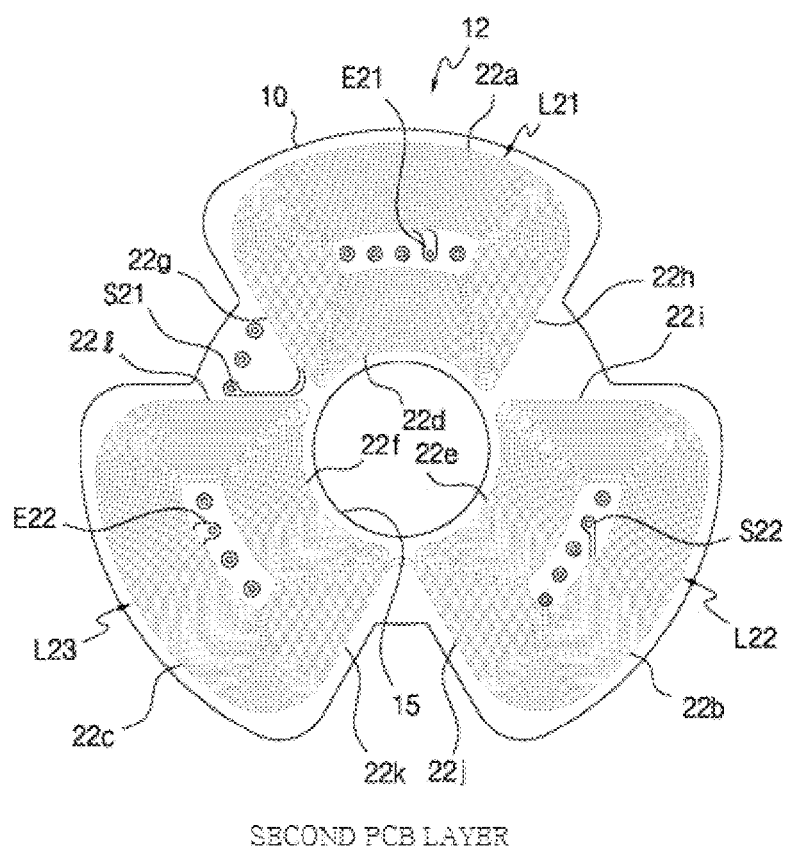
Figure 14:
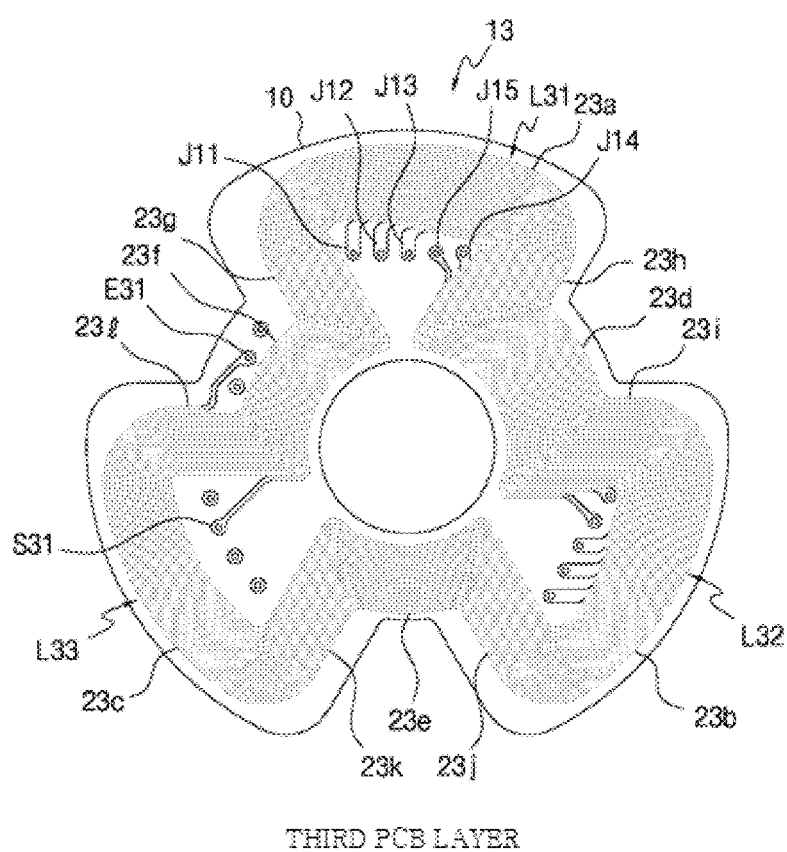
Figure 15:
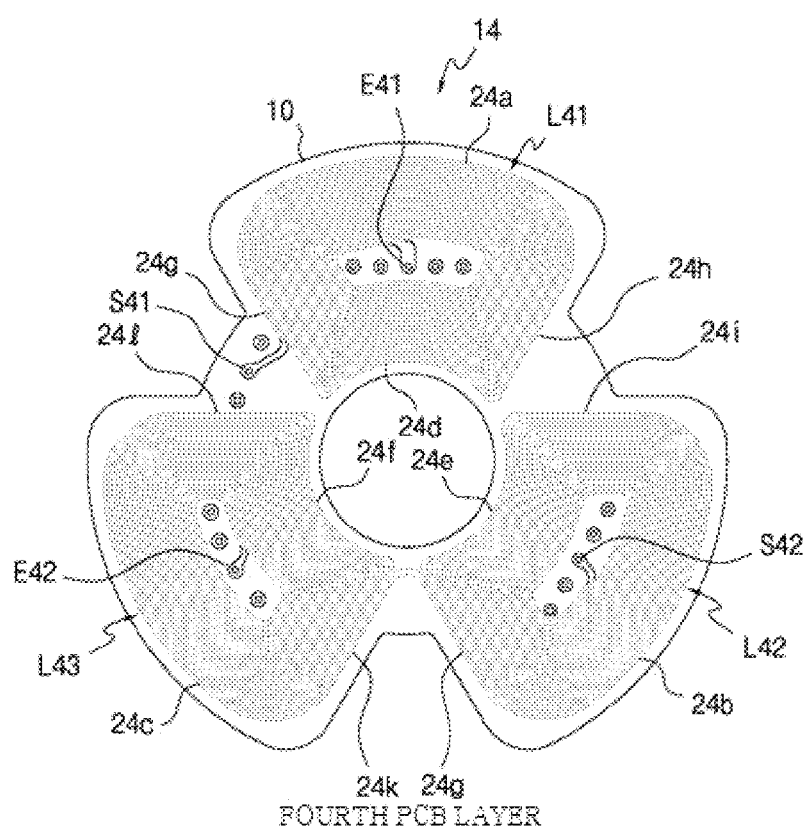
Figure 16:
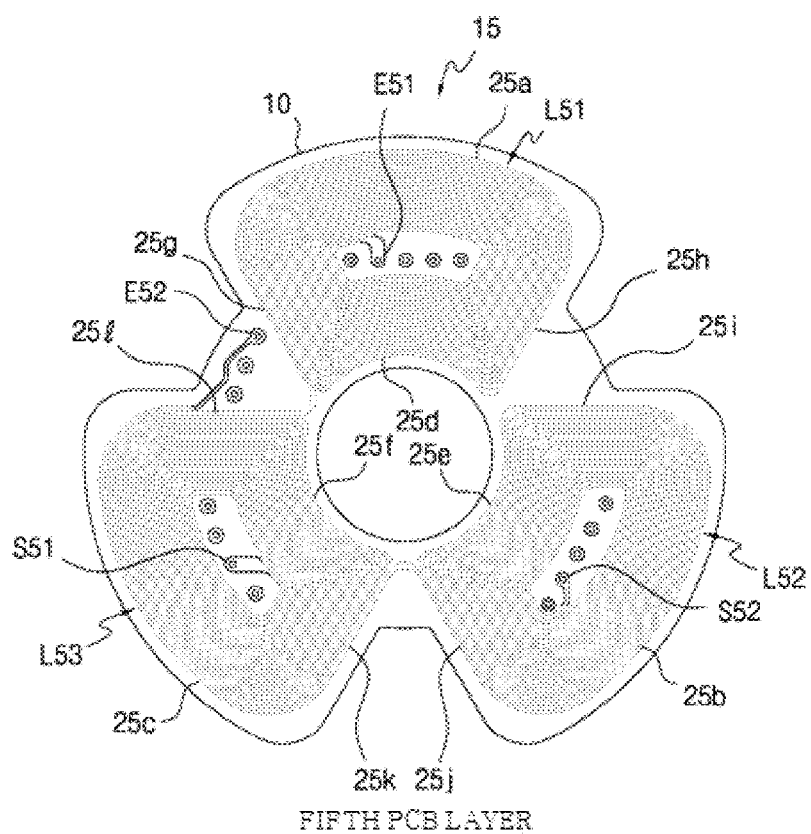

The second output terminal Out2 is connected to an integrated circuit (IC) 16 forming the motor driving circuit 30 via the printed wiring 17 as shown in FIG. 11. The other end of the coil patterns L11 to L62 connected in series, that is, the first output terminal Out1, the power supply terminal Vbb, and the ground pattern GND are provided in the integrated circuit (IC) 16 of the motor driving circuit 30, and a frequency generator (FG) signal output terminal for controlling the speed of the motor and a pulse width modulation (PWM) signal terminal for receiving a control signal for controlling the speed of the motor by a PWM method are also provided in the integrated circuit (IC) 16 of the motor driving circuit 30.

In some embodiments of the present disclosure, the plurality of coil patterns L11 to L62 of each PCB layer have a helical shape and are directed from the inside to the outside or from the outside to the inside depending on the series or parallel connection of the coil patterns using the throughholes and the jumper wire patterns. The circuit configuration can be made by combining patterns that are wound in the clockwise (CW) direction or the counterclockwise (CCW) direction.

As shown in FIGS. 12 to 17, the stator 110 according to an embodiment of the present disclosure is constituted by a multilayer PCB in which first to sixth PCB layers 11 to 16 are laminated in a six-layer structure, and each PCB layer has the coil patterns L11-L62 each having three fan-like shapes and the multilayer PCB 10 includes three protrusions 10a-10c along three fan-like shapes, and three recesses 10d-10f disposed between the protrusions 10a-10c.

The three protrusions 10a to 10c have outer circumferential portions formed in the same curvature as the fan-shaped outer rotating direction pattern portions 20a to 20c, and both side surfaces of each of the three protrusions 10a to 10c are formed to have a shape that narrows along a fan shape, respectively.

In addition, in the inside of the coil patterns L11 to L62, three throughhole forming spaces 51-53 for arranging five or four throughholes T14 to T27 for mutually connecting the coil patterns are formed in a predetermined length and width, respectively.

Further, two throughhole forming spaces 54 and 55 are arranged on the same circumference as the throughhole forming spaces 51-53 on the inner side of the recesses 10d and 10f located on the left and right sides among the three recesses 10d to 10f, that is, in the multilayer PCB 10, and three throughholes T11 to T13 are arranged in a throughhole forming space 55. The outer circumferential portions of the throughhole forming spaces 54 and 55 are arranged to have an outline with a curvature corresponding to the inner circumferential portion of the outer rotating direction pattern portions 20a to 20c.

The outer circumferential portion of the multilayer PCB 10 defining a recess 10e disposed on the lower side of the multilayer PCB 10 is aligned to have an outline with a curvature corresponding to the outer circumferential portions of the inner rotating direction pattern portions 20d to 20f, and is formed deeper than the recesses 10d and 10f to secure a wider air flow path.

The three recesses 10d-10f disposed between the three protrusions 10a-10c secure a sufficient space. Accordingly, when the lower case 101 is provided with the stator 110 as shown in FIGS. 1 to 3, the flow of the air sucked into the wind inlet 108 of the lower case 101 is not disturbed.

That is, in some embodiments of the present disclosure, three large recesses 10d-10f are provided in the stator 110 while ensuring coil patterns of a sufficient number of turns necessary for generating a desired torque of a single-phase motor, to minimize the resistance of the air sucked in the wind inlet 108 of the lower case 101.

In the above description of the embodiment, three protrusions 10a-10c and three recesses 10d-10f provided between the three protrusions 10a-10c are arranged on the multilayer PCB 10, in order to minimize the resistance of air sucked into the wind inlet 108, but the present disclosure is not limited to the number of recesses corresponding to (the number of magnetic poles of the rotor)/2.

In other words, the multilayer PCB may include at least one protrusion corresponding to the plurality of coil patterns and at least one recess disposed between the plurality of coil patterns.

The multilayer PCB may have protrusions corresponding to the plurality of coil patterns and recesses disposed between the protrusions. In addition, the number of protrusions and the number of recesses may correspond to 1, 2, or (the number of magnetic poles of the rotor)/2, respectively.

Referring to FIGS. 8 to 17, the coil patterns L11-L13, L21-L23, L31-L33, L41-L43, L51-L53 and L61-L62 have three fan-like shapes in common in each PCB layer, in which the six radial direction pattern portions 20g-20l, 22g-22l, 23g-23l, 24g-24l, 25g-25l and 26g-26j arranged along the radial direction from the center O, and six inner and outer rotating direction patterns 20a-20f, 22a-22f, 23a-23f, 24a-24f, 25a-25f, and 26a, 26b, 26d and 26e which interconnect the six radial direction pattern portions 20g-20l, 22g-22l, 23g-23l, 24g-24l, 25g-25l and 26g-26j.

In this case, each of the six radial direction pattern portions 20g to 26j is oriented in a direction which radiates from the center O of the multilayer PCB 10 as a whole or in a direction parallel to the radial direction.

As a result, the six radial direction pattern portions 20g to 26j in the coil pattern have a structure in which they are arranged at the same positions for each PCB layer. The coil pattern has a position opposite to the magnet of the rotor at the same time, and generates a combined torque as the direction of current flow is set identically.

In the case of the stator 110 according to an embodiment of the present disclosure, the coil patterns L11 to L62 formed on the multilayer PCB are interconnected to form a stator coil, the number of the radial direction pattern portions 20g to 26j in each PCB layer is equal to the number of magnetic poles of the opposite rotor, and the angle between the adjacent radial direction pattern portions is preferably determined to be 360°/(the number of magnetic poles of the rotor).

Therefore, in the case of a stator having six radial direction pattern portions 20g to 26j, the angle between the adjacent radial direction pattern portions 20g to 26j is 60° and the number of the magnetic pole of the rotor, that is, the number of the N-pole magnets and the S-pole magnets have six poles, in which the rotor is coupled to a single-phase motor to rotate to form the single-phase motor.

The coil patterns L61 and L62 may be formed on the sixth PCB layer 16 by utilizing a space remaining after mounting components of the motor driving circuit 30 and the coil patterns L61 and L62 may be omitted depending on the torque value required to rotate the rotor.

Figure 17:
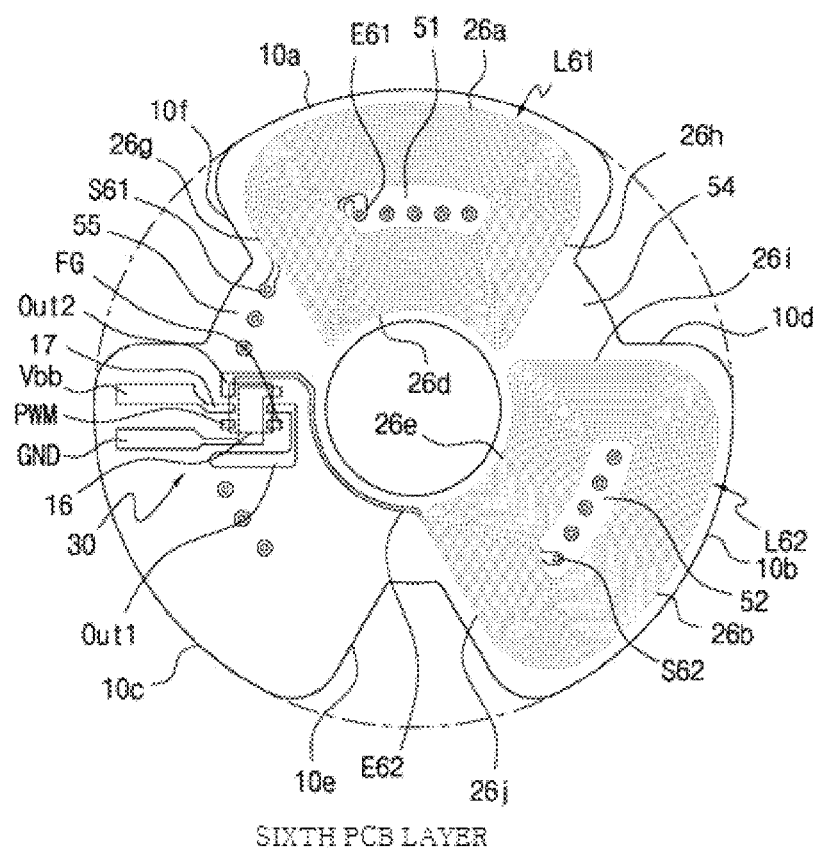

The sixth PCB layer 16 shown in FIG. 17 is shown in a perspective view, and various patterns, i.e., the coil patterns L61 and L62, and the printed wiring 17 and the integrated circuit (IC) 16 mounted thereon are located on the rear surface of the multilayer PCB 10.

When the first to sixth PCB layers 11 to 16 according to an embodiment of the present disclosure are stacked, the coil patterns are connected in series, to then form one stator coil as shown in FIG. 10.

In the case of the stator 110 for a single-phase motor according to an embodiment of the present disclosure, first to fifth PCB layers 11 to 15 each having a coil pattern formed thereon form coil pattern layers, and a sixth PCB layer 16 forms a driving circuit layer in which the motor driving circuit 30 is mounted.

In some embodiments of the present disclosure, 27 throughholes T11 to T27 are formed in the same positions of the first to sixth PCB layers 11 to 16 by plating the throughholes T11 to T27 or conductive powder filled in the throughholes T11 to T27 so as to have conductivity, and soldering lands around the throughholes T11 to T27 are formed in the conductive pattern. As illustrated, the start portions S11 to S62 and the end portions E11 to E62 in the coil patterns L11 to L62 are wider than the portions forming the coil (i.e., the winding), for example, in the form of tear drop, respectively.

As a result, in some embodiments of the present disclosure, the start portions S11 to S62 and the end portions E11 to E62 are formed wider than the portions forming the coil (i.e., the winding) by controlling the thickness of the coil pattern of each PCB layer in a slim-type stator.

That is, the start portion and the end portion of the coil pattern are formed in the form of a tear drop, and the throughholes and the soldering lands surrounding the throughholes are disposed to interconnect the coil patterns, or ease the connections to the wiring patterns and guarantee the reliability of the connections.

Further, in order to increase the reliability, throughholes T11-T27 connecting the start portions and the end portions in each PCB layer may be formed in the number of at least one so as to prevent the reliability from being deteriorated due to the breakage of the wire or the badness of the throughhole.

When the first to sixth PCB layers 11 to 16 according to an embodiment are stacked, the coil patterns L11 to L62 are interconnected through the throughholes T11 to T27 and the first and fifth jumper wire patterns J11 to J15, to thereby form one stator coil shown in FIG. 10.

That is, the coil pattern L13 of the first PCB layer 11 is connected to the first output terminal Out1 of the motor driving circuit 30 via the throughhole T27 at the start portion S11, and the coil pattern L13 is formed by winding the coil in a helical shape in a clockwise (CW) direction from the inner side to the outer side. Then, the coil pattern L11 is formed by winding the coil in a helical shape in a clockwise (CW) direction from the outer side to the inner side. Then, the end portion E11 is connected to the inner-side throughhole T18.

The end portion E11 is wound in the clockwise (CW) direction from the inner side to the outer side to form the coil pattern L12, so that the end portion E11 of the coil pattern L11 forms the lower coil pattern L12 via the fourth jumper wire pattern J14 connected to the throughhole T18, and the end portion E12 extends along the outer periphery of the coil pattern L13 and is then connected to the throughhole T11 located in a throughhole forming space 55.

The throughhole T11 is connected to the start portion S21 of the second PCB layer PCB 12 and then the start portion S21 extends to form the coil pattern L21 and is connected to the inner end portion E21.

In the same manner as the above, the copper foil is patterned on the first to sixth PCB layers 11 to 16 to form the coil patterns L11 to L62 and then the inner portions of the throughholes T11 to T27 are plated. Then, the coil patterns L11 to L62 are connected via the throughholes T11 to T27 and the first to fifth jumper wire patterns J11 to J15 as shown in FIG. 10 to form a stator coil.

As a result, one end of the stator coil, that is, the end portion E62 of the coil pattern L62 is connected to the second output terminal Out2 of the motor driving circuit and the other end of the stator coil, that is, the start portion S11 of the coil pattern L13 is connected to the first output terminal Out1 of the motor driving circuit via the throughhole T27.

In some embodiments of the present disclosure, since the throughholes T11 to T27 and the first to fifth jumper wire patterns J11 to J15 are effectively used, the coil patterns of the multilayer PCB can be connected in series or parallel without using a separate wiring pattern PCB.

Although the motor driving circuit 30 for driving the single-phase motor is mounted on the sixth PCB layer 16 in the embodiment shown in FIG. 17, the motor driving circuit may be separately formed.

Hereinafter, a single-phase motor using the slim-type stator according to an embodiment of the present disclosure will be described with reference to FIGS. 8 to 17.

Since the coil patterns L11 to L62 are all wound in the clockwise (CW) direction to form the stator coil connected in series, the current flow of the coil patterns L11 to L13 of the first PCB layer 11 for rotational position of the rotor is the same as the current flow of the coil patterns L21 to L62 of the second to sixth PCB layers 12-16, and thus only the coil patterns L11 to L13 of the first PCB layer 11 will be mainly described.

The single-phase motor 40 illustrated in FIG. 8 has a structure in which a stator 110 and a rotor 120 of a 6-slot-6-pole structure are arranged in an axial type so as to face each other, but the stator 110 and the rotor 120 of the 6-slot-6-pole structure are shown together on the same plane for convenience of explanation.

In the case that the drive power supply Vbb is supplied to the motor driving circuit 30 when the rotor 120 is at the initial position (i.e., 0°), the Hall sensor H1 recognizes the magnetic pole (S-pole) 121f of the rotor and generates a pair of first rotor position detection signals containing the rotating direction (that is, counterclockwise (CCW) direction) of the rotor. When the pair of first rotor position detection signals are applied to first and second switching transistors of the motor driving circuit 30, the first switching transistor is turned on and the second switching transistor is turned off so that the direction of current flow of the driving current to the stator coils, that is, the coil patterns L11 to L62, is determined.

A current flows from the start portion S11 of the coil pattern L13 to the end portion E62 of the coil pattern L62 as the rotating direction of the rotor is determined as the counterclockwise (CCW) direction. For example, the current flow directions are indicated by arrows on the coil patterns L11 to L13 of the first PCB layer 11 shown in FIGS.

8 and 12. The direction in which the current flows through the coil patterns L21 to L62 of the second to sixth PCB layers 12-16 is the same as the direction in which the current flows through the coil patterns L11 to L13 of the first PCB layer 11, and so the detailed description will be omitted.

In this case, since the outer and inner rotating direction pattern portions 20a to 20c and 20d to 20f of the coil patterns L11 to L62 are arranged in a substantially concentric circle shape, the force (F) generated by the Fleming's left-hand rule is directed in the radial direction and thus does not affect the torque generation.

The coil patterns L11 to L62 are formed so that the directions of the driving currents flowing in the radial direction pattern portions 20g-20l, 22g-22l, 23g-23l, 24g-24l, 25g-25l and 26g-26j are the current flow directions which are all set in the same direction. As a result, the radial direction pattern portions 20g-20l, 22g-22l, 23g-23l, 24g-24l, 25g-25l, and 26g-26j are oriented in the radial direction (that is, in the normal direction) which is perpendicular with the rotating direction (that is, the circumferential direction) of the rotor 120, and thus a tangential force F is generated in the counterclockwise (CCW) direction according to the Fleming's left-hand rule.

Therefore, the outer and inner rotating direction pattern portions 20a to 20f of the coil patterns L11 to L62 serve as a path through which only current flows and a tangential force is generated in a counterclockwise (CCW) direction from the six radial direction pattern portions 20g to 26j, to thereby make rotation of the rotor 120.

In addition, the directions of the currents flowing in the coils between the adjacent radial direction pattern portions 20g to 26j are reversed and the magnetic poles (N-poles) 121e, 121c, and 121a of the magnets of the rotor 120 corresponding to the directions of the currents are also reversed, and thus forces to push or pull the rotor magnets are all generated in the same direction, thereby rotating the rotor in the counterclockwise (CCW) direction.

Then, when the rotor 120 rotates by a mechanical angle of 45° (an electrical angle) 135°, the Hall sensor H1 is positioned on the interface 121g between the N-pole magnet 121a and the S-pole magnet 121f. Thus, the Hall sensor H1 does not recognize the magnetic poles and does not determine the direction of current flow.

When the rotor 120 is rotated by a mechanical angle of 45° (an electrical angle 135°) by the rotational inertia, the Hall sensor H1 recognizes the N-pole magnet 121a. In this case, the Hall sensor H1 generates a pair of second rotor position signal outputs having the opposite polarity to the first rotor position signal and applies the generated pair of second rotor position signal outputs to first and second switching transistors, so that the first switching transistor is turned off and the second switching transistor is turned on and thus the current flow direction of the driving current to the stator coils, that is, the coil patterns L11 to L62, is set to be opposite.

As a result, when the current flow direction of the driving current with respect to the coil patterns L11 to L62 is reversed, a tangential force F is generated from the radial direction pattern portions 20g to 26j in the counterclockwise (CCW) direction in accordance with the Fleming's left-hand rule and the rotation of the rotor 120 is continued.

As described above, the motor driving circuit 30 detects the magnetic pole of the rotor every time the Hall sensor H1 rotates by 60° in a machine angle (or by 180° in an electrical angle), and generates alternately the first rotor position signal and the second rotor position signal. Accordingly, the first and second switching transistors are alternately turned on and off to change the direction of current flow of the driving current to the coil patterns L11 to L62.

In the single-phase motor 40 according to an embodiment of the present disclosure, the slim-type stator 110 is constituted by using the multilayer printed circuit board (PCB), and the coil patterns L11-L62 of each PCB layer form a three-fan-shaped or star-shaped pattern. However, the radial direction pattern portions 20g to 26j among the plurality of rotating direction pattern portions and the radial direction pattern portions 20g to 26j constituting the coil patterns L11 to L62 are oriented in the radial direction and in the direction parallel to the radial direction. Therefore, the torque applied to the opposed rotor 120, that is, the rotational force, can be maximally obtained.

In the slim-type stator according to the embodiment of the present disclosure, the coil pattern of each PCB layer may be deformed into a shape other than a fan-shaped or star-shaped pattern.

The important point in this modification is that the radial direction pattern portions of the coil patterns disposed at the same position are all connected in such a manner that current flows in the same direction, and the coil pattern connecting the adjacent rotating direction pattern portions is oriented in the radial direction and in the direction parallel to the radial direction. Therefore, it is preferable to design the slim-type stator so that the torque applied to the opposed rotor 120, that is, the rotational force, can be maximally obtained.

As described above, the single-phase motor according to the embodiment of the present disclosure uses, for example, a coil pattern having a fan shape and/or a star shape as a stator, and a Hall sensor H1 for detecting rotor position, is disposed in the PCB forming the stator. It is possible to form a yoke on a bridge by forming a lower case so as to constitute the yoke capable of preventing a dead point while using a soft magnetic body made of an iron plate or silicon steel as a lower case, in order to implement a self-starting scheme.

When the lower case having the dead point prevention yoke function is used, the initial position of the rotor can be set to stop at a predetermined position. When the Hall sensor is installed at a position where the dead point can be prevented in consideration of the initial position of the rotor, a self-starting failure phenomenon can be avoided.

In this case, the multilayer PCB is formed in a shape having three fan-shaped protrusions and three fan-shaped recesses so that the stator has, for example, three fan-shaped coil patterns. Accordingly, the recesses can be used as a path of the wind inlet in the Sirocco-type fan, to thereby increase the amount of airflow.

In some embodiments of the present disclosure, the shape of the multilayer PCB can be designed so as to have protrusions and recesses corresponding to (the number of magnetic poles of the rotor)/2.

In the above embodiment according to the present disclosure, the slim-type stator has been described by taking a single-phase motor having a six-pole-six-slot structure as an example. However, the present disclosure can be applied to a single-phase motor having an even-numbered pole-even-numbered slot structure. Here, the coil pattern of each PCB layer may be deformed into a shape other than a fan-shaped or star-shaped pattern.

In addition, in the above description of the embodiment, the bridge corresponding to the number of rotor magnetic poles is formed while forming the wind inlet in the lower case to prevent a dead point, thereby implementing a dead point prevention yoke function without using a separate dead point prevention yoke. However, a method of disposing a dead point prevention yoke 170 on a lower portion of the stator 110 may be employed as shown in FIG. 18.

In this case, the dead point prevention yoke 170 has a hexagonal outer circumferential surface and a circular inner circumferential surface in the same manner as the number of magnetic poles (six poles) of the rotor. When the dead point prevention yoke 170 is used, the center of each magnet is located opposite to a point at which an effective area width of the dead point prevention yoke 170 is the widest (i.e., a corner), by a magnetic phenomenon between the magnet of the rotor 120 and the dead point prevention yoke 170 when the rotor 120 is in an initial state (that is, 0°), so that the Hall sensor H1 is located at a position deviated from the interface 121g of the magnetic poles of the rotor 120 to thereby solve the self-starting failure.

In this case, the position of the Hall sensor H1 is preferably provided at a position deviated by a ¼ magnetic pole width from the interface 121g of the magnetic poles or the center of the magnetic pole, in the same manner as the case where the bridges corresponding to the number of rotor magnetic poles are formed in the lower case, to thereby implement the dead point prevention yoke function.

Figure 18:
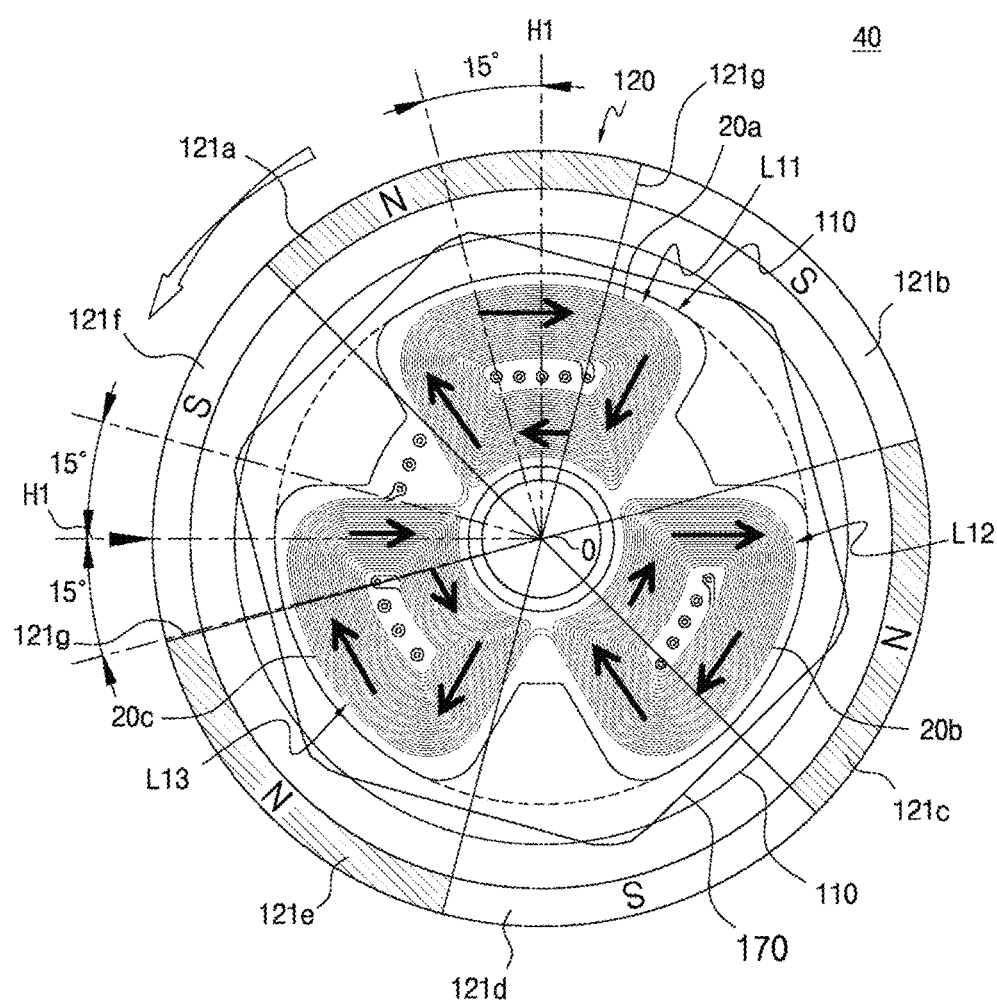
FIG. 18 is a view for explaining dead point prevention when a rotor is in an initial state, by disposing a dead point prevention yoke at a lower portion of a stator according to the present disclosure.

The dead point prevention yoke 170 according to the embodiment of the present disclosure has a hexagonal outer circumferential surface in the same manner as the number of magnetic poles of the rotor (six poles) as shown in FIG. 18. However, the dead point prevention yoke may be a polygon having corners of (the number of magnetic poles)/N (where N is 1, 2, or 3).

That is, the dead point prevention yoke 170 preferably has an outer circumferential surface of a polygonal shape with corners (number of magnetic poles)/N (where N is a divisor of the number of magnetic poles), and a circular inner circumferential surface.

When the rotor is in an initial state (i.e., in a stopped state), the center of one of the magnetic poles of the rotor coincides with a corner, in the case that the number of corners is one. When there are two corners, they are arranged at intervals of 180 degrees. When there are three corners, they are arranged at intervals of 120 degrees. When the rotor is in the initial state, the corners coincide with the centers of the magnetic poles, respectively.

In the case of the lower case according to the embodiment shown in FIG. 4, a plurality of bridges are provided corresponding to the number of magnetic poles so as to have a dead point preventing yoke function, and a space between the bridges serves as a wind inlet.

In some embodiments of the present disclosure, the bridge provided at the wind inlet may be modified to use only a part of the outer or inner portion of the magnetic force line of the magnet to minimize the starting torque of the fan, thereby maximizing the maneuverability and realizing the dead point prevention yoke function.

Figure 19A:
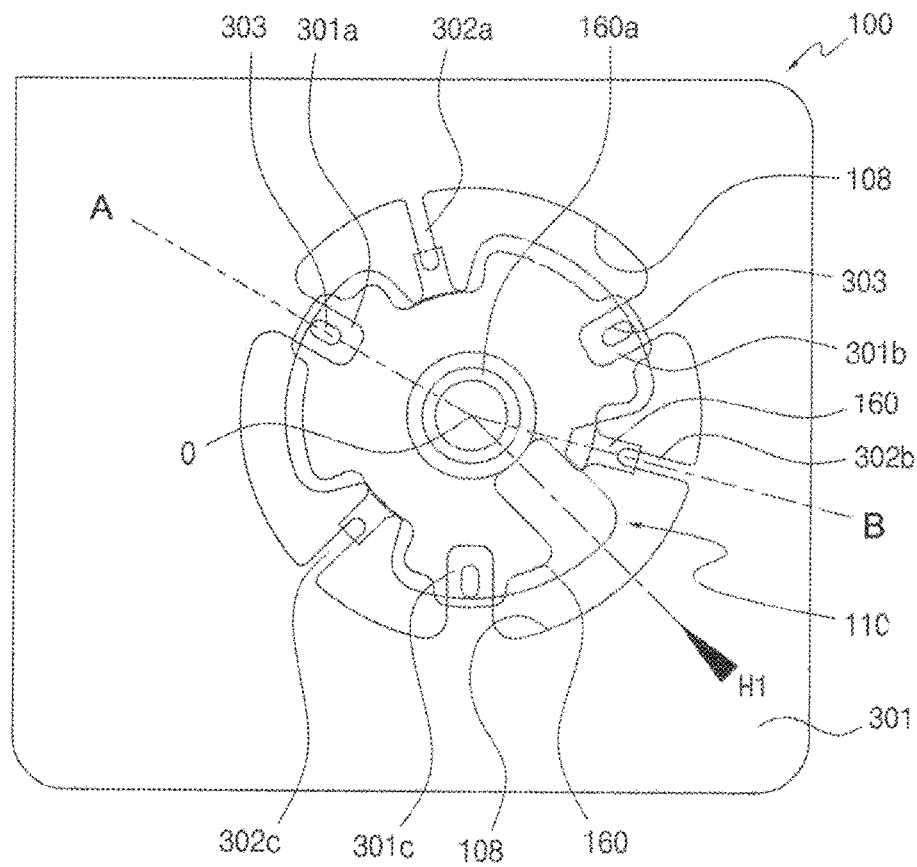
FIG. 19A shows a variation which is capable of minimizing a starting torque of a fan, maximizing maneuverability, and implementing a dead point prevention yoke function, while showing a lower case having a dead point prevention yoke function according to a third embodiment of the present disclosure, together with a stator.
Figure 19B:
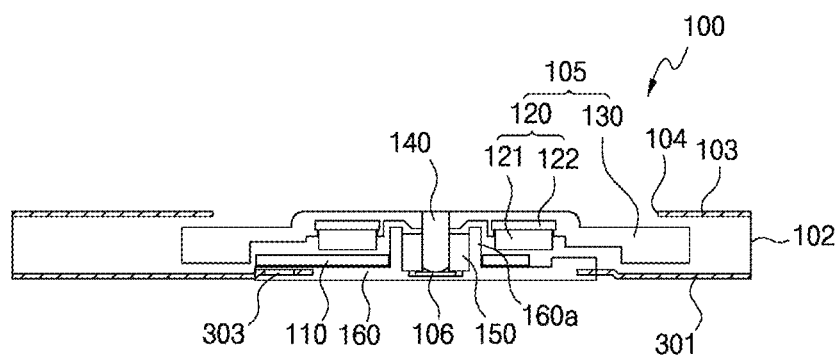
FIG. 19B is a cross-sectional view taken along line A-O-B in FIG. 19A.

FIG. 19A shows a modified example in which the dead point prevention yoke function can be implemented while maximizing the maneuverability by minimizing the starting torque of the fan according to a third embodiment of the present disclosure, and FIG. 19B is a cross-sectional view taken along line A-O-B in FIG. 19A.

Referring to FIGS. 19A and 19B, a cooling fan 100 using a slim-type single-phase motor according to the third embodiment of the present disclosure includes a case formed by coupling an upper case 103 and a lower case 101 having a side wall 102 formed therein, and a slim-type single-phase motor 40 implemented using a slim-type stator 110 provided inside the case.

The single-phase motor 40 includes the slim-type stator 110, a sleeve bearing 150, a rotating shaft 140, and a rotor 120. In addition, a plurality of blades 130 are integrally formed on an outer surface of a back yoke 122 of the rotor 120 to constitute an impeller 105.

The third embodiment differs from the first and second embodiments in that the back yoke 122 of the rotor 120 is formed in a band shape, and the magnets 121, the back yoke 122 and the plurality of blades 130 are integrally formed by using the resin by the insert molding method to constitute the impeller 105.

In this case, one end of the rotating shaft 140 is integrally formed at a center of the impeller 105 by an insert molding method.

A bearing holder 160 for receiving the sleeve bearing 150 at a central portion of the lower case 101 is integrally formed by, for example, insert molding. The bearing holder 160 includes the sleeve bearing 150 inserted into a cylindrical protruded boss 160a.

In addition, a thrust plate (or a bearing seat) 106 is provided between the sleeve bearing 150 and the inner bottom surface of the bearing holder 160 to support the rotating shaft 140 of the rotor 120.

The slit-type stator 110 according to the embodiment of the present disclosure is mounted on the bottom surface of the lower case 301. A penetration opening having a size larger than the outer diameter of the boss 160a of the bearing holder 160 is formed at the center of the stator 110.

The rotating shaft 140 of the rotor 120 is coupled to the penetration opening of the sleeve bearing 150 and the rotating shaft 140 is fixed to the center of the rotor 120.

The rotor 120 includes a band-shaped back yoke 122 made of a magnetic material and magnets 121 fixed to the front surface of the back yoke 122 so as to serve as a magnetic path in which the magnets 121 constitute a single-phase motor 40 in an axial type structure in which the magnets 121 are disposed in a face-to-face fashion to the coil of the stator 110.

A plurality of blades 130 are integrally formed on the outer surface of the back yoke 122 of the rotor 120 by insert molding to constitute an impeller 105. In this case, the inner body of the impeller 105 forms a disk shape, from which the plurality of blades 130 may be formed while extending at an inclination angle or extending in the radial direction.

In the lower case 301, a side wall 102 is formed at a right angle on the outer circumferential portion, and one side of the side wall 102 is opened to constitute a Sirocco type fan by being coupled with the upper case 103. Accordingly, a wind outlet for discharging the sucked air is formed at the one side of the side wall 102. In this case, the side wall 102 is formed of the same resin as the bearing holder 160 and is integrally formed with the lower case 301 made of metal by insert molding.

The upper case 103 is also provided with a wind inlet 104 having at least one penetration opening for sucking the heated air inside the main body (for example, an electronic component such as a wireless charger or the like) from a direction opposite to the upper case 103, similarly to the lower case 301.

The cooling fan 100 according to the embodiment of the present disclosure shown in FIGS. 19A and 19B has wind inlets 104 and 108 in both the upper case 103 and the lower case 301. In the lower case 301, a plurality of, for example, three yoke protrusions 301a-301c protrude from the lower case 301 into the wind inlet 108 so as to have a dead point prevention yoke function.

The three yoke projections 301a-301c each have a long hole 303 which is penetratively formed so as to reinforce a coupling force by increasing a contact area between the yoke protrusions 301a-301c and the bearing holder 160 when the bearing holder 160 is integrally formed in the lower case 301 by the insert molding method.

In addition, a plurality of, for example, three support protrusions 302a-302c protrude from the lower case 301 into the wind inlet 108 between the three yoke protrusions 301a-301c.

The three support protrusions 302a-302c have a shorter protrusion length than the yoke protrusions 301a-301c and thus do not have a dead point prevention yoke function, but are insert-molded together with the bearing holder 160 to reinforce the support force.

In the third embodiment, the lower case 301 uses a soft magnetic material having a low coercive force such as silicon steel or pure iron to serve as yoke, and the number of the protrusions 301a to 301c formed in the lower case 301 so as to have a dead point prevention yoke function may be not only the number corresponding to the number of magnetic poles of the rotor 120 on a one-to-one basis but also (the number of magnetic poles)/N (where N is a divisor of the number of magnetic poles).

In this case, when the rotor is in an initial state (that is, in a stopped state), one center of the magnetic poles of the rotor coincides with a protrusion in the case that the number of protrusions is one. When there are two protrusions, they are arranged at intervals of 180 degrees. When there are three protrusions 301a to 301c, they are arranged at intervals of 120 degrees as shown in FIG. 19A. When the rotor is in an initial state, the protrusions coincide with the centers of the magnetic poles, respectively.

In this case, it is preferable that the yoke protrusions 301a-301c provided in the wind inlet 108 use only a part of the outer portion or the inner portion of the magnetic force line of the magnet 121, because the starting torque of the fan can be minimized.

Simultaneously in consideration of this, it is preferable that strength supporting protrusions 302a-302c should be provided to firmly support the bearing housing 160, which supports the stator 110 and the impeller 105, to the lower case 301.

In addition, when the number of magnetic poles of the rotor is six, three yoke protrusions 301a-301c and three supporting protrusions 302a-302c are formed to balance and support three protrusions 10a-10c of the multilayer PCB 10 on a one-to-one basis and, at the same time, to use only a part of the outer side or the inner side of the magnetic force line of the magnet 121, to minimize the starting torque of the fan, thereby maximizing the maneuverability.

When the yoke protrusions are formed in consideration of the number of magnetic poles of the rotor 120 in the lower case 301 formed of a soft magnetic material capable of acting as a yoke as described above, the center of each magnet 121 is stopped between the magnet 121 of the rotor 120 and the yoke protrusion at a position opposite to the yoke protrusion by the magnetic phenomenon, in an initial state (i.e., in a stopped state) of the rotor 120.

Therefore, the Hall sensor H1 for detecting the magnetic pole of the rotor in consideration of the initial state of the rotor 120 is installed on the stator 110, that is, the PCB 10 at a position deviated by a ¼ magnetic pole width (15° in the case of a six-pole rotor) or a ¾ magnetic pole width from a magnetic pole interface 121g or a center of the magnet 121, respectively, as shown in FIG. 19A, to avoid a self-starting failure phenomenon.

In addition, it is preferable that the Hall sensor H1 should be disposed at a position deviated by a ¼ magnetic pole width (15° in the case of a six-pole rotor) from the magnetic interface 121a and at the same time, it is preferable to set one radial direction pattern portion 20l of the radial direction pattern portions 20g to 20l of the coil patterns L11 to L13 of the first PCB layer 11 to face the Hall sensor H1 in the slim-type stator 110.

In this case, when the driving power is applied to the motor driving circuit 30 and the rotor 120 is started, the Hall sensor H1 detects the magnetic poles of the opposed magnets with high sensitivity, so that, since the radial direction pattern portion 20l is opposed to a point at which the magnetic flux generated from the magnets becomes maximum, to thereby perform a self-starting more easily.

As a result, the three yoke protrusions 301a-301c formed in the lower case 301 have the dead point prevention yoke function, and the spaces between the yoke protrusions 301a-301c serve as the wind inlets 108. Thus, it is possible to further enlarge the areas of the wind inlets 108.

The single-phase motor of the above-described embodiments can be operated not only by a single-phase full-wave driving system but also by a single-phase half-wave driving system.

While the present disclosure has been particularly shown and described with reference to exemplary embodiments thereof, by way of illustration and example only, it is clearly understood that the present disclosure is not to be construed as limiting the present disclosure, and various changes and modifications may be made by those skilled in the art within the protective scope of the invention without departing off the spirit of the present disclosure.

INDUSTRIAL APPLICABILITY

The present disclosure relates to a cooling fan using a single-phase motor using a single coil, and can be applied to any cooling fan, in which wide passage of a wind inlet can be ensured and an airflow can be increased in a Sirocco type fan, since a portion on which a coil pattern is not formed is removed from a multilayer PCB constituting a stator.

What is claimed is:

1. A slim-type stator comprising:
   a multilayer printed circuit board (PCB); and
   a plurality of coil patterns formed on each PCB layer of the multilayer PCB, wherein the coil patterns are connected with other coil patterns formed on an adjacent PCB layer via throughholes formed in the each PCB layer, and the coil patterns are connected with each other so as to form a single-phase motor,
   wherein a number of the coil patterns corresponds to (a number of magnetic poles of a rotor)/2, and each of the coil patterns is formed of a spiral conductive pattern forming a plurality of turns and having a fan-like shape,
   wherein the multilayer PCB comprises: a protrusion corresponding to each of the coil patterns and a recess formed between two neighboring protrusions, and
   wherein the recess is configured to be used as a wind inlet passage in a Sirocco-type fan, thereby increasing an amount of airflow.

2. The slim-type stator of claim 1, further comprising a Hall sensor disposed on the multilayer PCB for detecting a rotor rotation position,
   wherein the Hall sensor is disposed at a position deviated by a ¼ magnetic pole width from an interface of the magnetic poles or a center of the magnetic poles when the rotor is in an initial state.

3. The slim-type stator of claim 2, wherein the dead point prevention yoke is bridges formed in a lower case of the single-phase motor, a number of the bridges are (the number of magnetic poles)/N where N is a divisor of the number of the magnetic poles.

4. The slim-type stator of claim 2, wherein the dead point prevention yoke is stacked on a lower portion of the stator, and has a polygonal shape, wherein an outer periphery of the polygonal shape has a number of corners corresponding to (the number of the magnetic poles)/N where N is a divisor of the number of magnetic poles, and an inner periphery of the polygonal shape has a circular shape.

5. The slim-type stator of claim 1, wherein each of the coil patterns comprises:
   inner and outer rotating direction pattern portions disposed concentrically at intervals on an inner circumference and an outer circumference in the circumferential direction; and
   a pair of radial direction pattern portions, both ends of which are arranged along the radial direction, and interconnect the inner rotating direction pattern portion and the outer rotating direction pattern portion.

6. The slim-type stator of claim 5, wherein the outer rotating direction pattern portion is longer than the inner rotating direction pattern portion so that the radial direction pattern portion interconnects the inner rotating direction pattern portion and the outer rotating direction pattern portion with each other along the radial direction from the center thereof.

7. The slim-type stator of claim 5, further comprising a Hall sensor disposed on the multilayer PCB for detecting a rotor rotation position, wherein the Hall sensor is disposed at a position overlapping one of the radial direction pattern portions of the stator.

8. The slim-type stator of claim 1, further comprising a driving circuit layer laminated on a lowermost PCB layer of the multilayer PCB and having a motor driving circuit mounted for applying a driving current to the coil patterns.

* * * * *